(12) United States Patent
Hadigheh

(10) Patent No.: US 12,304,158 B2
(45) Date of Patent: May 20, 2025

(54) ALIGNED FIBRES AND A METHOD OF MAKING THE SAME

(71) Applicant: THE UNIVERSITY OF SYDNEY, Sydney (AU)

(72) Inventor: Seyed Ali Hadigheh, Sydney (AU)

(73) Assignee: The University of Sydney, Sydney (AU)

( * ) Notice: Subject to any disclaimer, the term of this patent is extended or adjusted under 35 U.S.C. 154(b) by 162 days.

(21) Appl. No.: 17/907,679

(22) PCT Filed: Mar. 31, 2021

(86) PCT No.: PCT/AU2021/050286
§ 371 (c)(1),
(2) Date: Sep. 29, 2022

(87) PCT Pub. No.: WO2021/195701
PCT Pub. Date: Oct. 7, 2021

(65) Prior Publication Data
US 2023/0138566 A1    May 4, 2023

(30) Foreign Application Priority Data
Mar. 31, 2020   (AU) .............................. 2020900983

(51) Int. Cl.
*B29C 70/14*     (2006.01)
*B29C 70/54*     (2006.01)

(52) U.S. Cl.
CPC .............. *B29C 70/14* (2013.01); *B29C 70/54* (2013.01)

(58) Field of Classification Search
CPC .......... B29C 70/54; B29C 70/14; B29C 70/50; D04H 1/4274; D04H 1/58; D04H 1/4242; D04H 1/74; C22C 47/025; Y02W 30/62
See application file for complete search history.

(56) References Cited

U.S. PATENT DOCUMENTS

| 3,617,437 | A | 11/1971 | Bagg et al. |
| 3,947,535 | A | 3/1976 | Bagg |
| 2003/0194544 | A1 | 10/2003 | Tobita |
| 2019/0048500 | A1 | 2/2019 | Tierney |

(Continued)

FOREIGN PATENT DOCUMENTS

GB    2236504 A    4/1991

OTHER PUBLICATIONS

European Search Report received in related European Patent Application No. 21781166.0, dated Aug. 2, 2023, 7 pages.

(Continued)

*Primary Examiner* — Monica A Huson
(74) *Attorney, Agent, or Firm* — Kilpatrick Townsend & Stockton LLP

(57) ABSTRACT

Provided herein is a method for aligning discontinuous fibres comprising: providing a stream of discontinuous fibres in a dispersion medium; applying a shear stress to the dispersion medium to align at least a portion of the discontinuous fibres; and disposing the at least a portion of the aligned discontinuous fibres on a substrate thereby providing a layer of substantially aligned discontinuous fibres. Also provided are discontinuous fibres aligned by such method and a composite material formed from the aligned discontinuous fibres.

20 Claims, 12 Drawing Sheets

(56) References Cited

U.S. PATENT DOCUMENTS

2019/0084000 A1    3/2019  Beck et al.
2019/0345647 A1*  11/2019  Zhamu ..................... D01F 9/12

OTHER PUBLICATIONS

International Search Report received in PCT/AU2021/050286, dated Jun. 7, 2021.
International Search Report for PCT/AU2021/050286, dated Jun. 7, 2021.

* cited by examiner

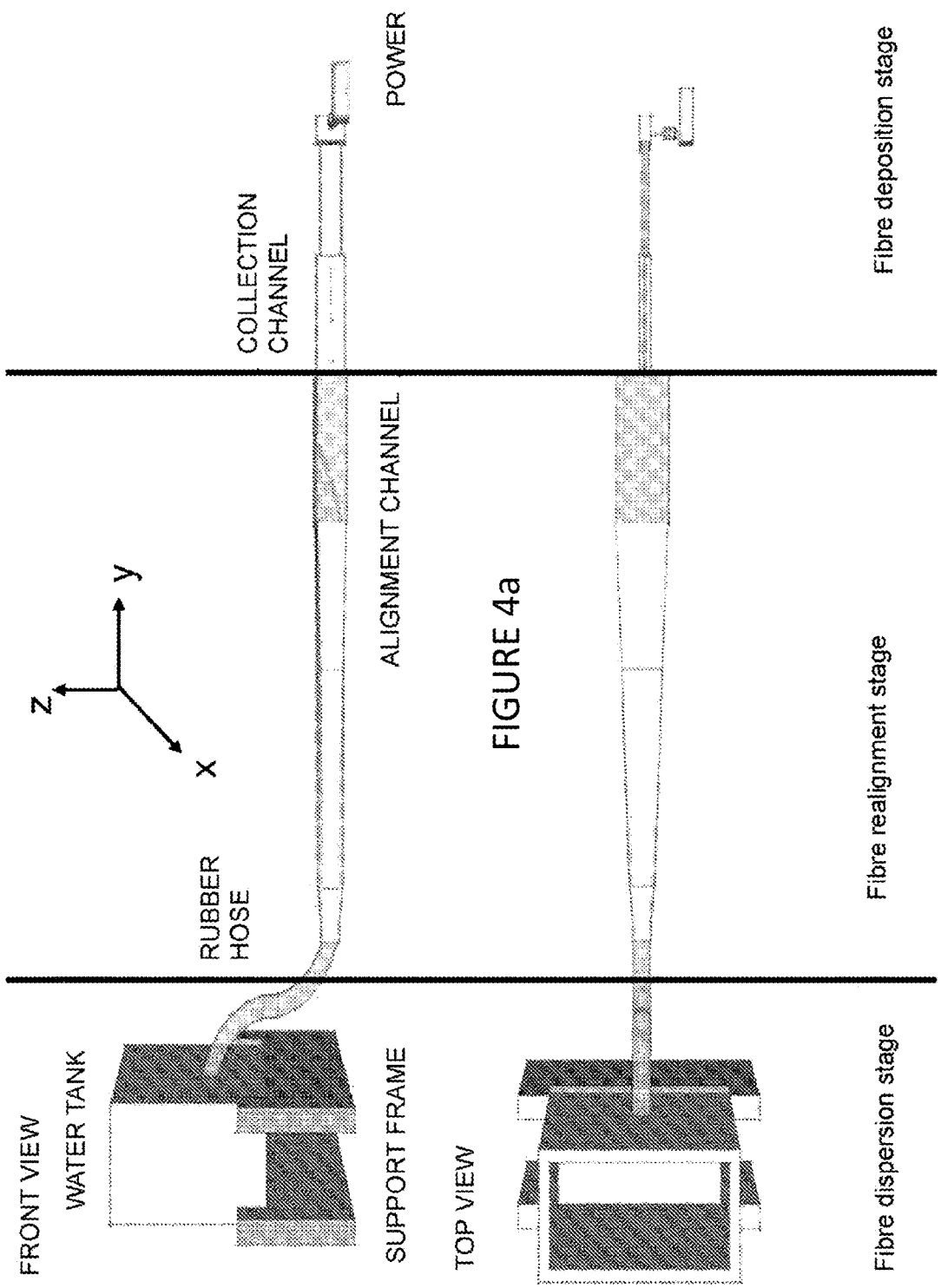

ALIGNED FIBRES AND A METHOD OF MAKING THE SAME

This application claims priority from International Patent Application No.: PCT/AU2021/050286, filed Mar. 31, 2021, which claims priority to Australian Provisional Patent Application No. 2020900983 filed 31 Mar. 2020, the contents of which are incorporated by reference herein in their entireties.

FIELD OF THE INVENTION

The present invention relates to the alignment of discontinuous (short) fibres to form composite materials and methods of making the same.

In particular, the present invention relates to the recovery of carbon fibre reinforced polymer (CFRP) composites comprising short and discontinued fibres of random orientation which conventionally are unsuitable for use in a woven form. Randomly oriented discontinuous carbon fibres prevents recycled carbon fibre (rCF) from being a direct substitute for virgin carbon fibre (VCF) and typically requires an additional conversion process to arrange individual filaments in a preferential direction to improve handling and processability. Recycled carbon fibre composites can be used in a number of applications including aerospace, energy, environment, construction materials and transportation. However, it will be appreciated that the invention is not limited to these particular fields of use.

BACKGROUND OF THE INVENTION

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of the common general knowledge in the field.

Carbon fibre reinforced polymer (CFRP) composites (also known as carbon fibre reinforced plastic, carbon fibre reinforced thermoplastic/thermoset or carbon composite) are being increasingly used in lightweight structures. CFRPs can be expensive to produce due to their reliance of virgin carbon fibre but are commonly used wherever high strength-to-weight ratio and stiffness (i.e., rigidity) is required. Carbon fibres have several advantages including for example high stiffness, high tensile strength, low weight, high chemical resistance, high temperature tolerance and low thermal expansion.

Due to these advantageous properties, CFRPs have found adoption in aerospace, superstructure of ships, defence, automotive, construction, renewable energy, civil engineering, sports equipment, and an increasing number of consumer and technical applications.

In 2010, the global production of fibre reinforced polymer (FRP) was approximately 6 million tonnes with a projected growth of 300% in the next decade. It is estimated that the consumption of FRP materials will be in excess of 18 million tonnes by 2025 with an end-product value of AUD$80 billion. The production of virgin carbon fibre (CF) which can be used as a component of these components is energy intensive.

However, the recovery of carbon fibre from waste composites (i.e., end-of-life composites) for reuse and recycling can significantly reduce the energy demand (by up to 70%) for production of new products using recycled carbon fibre. It is therefore desirable to recover and recycle end-of-life CF as it can provide an alternative source of CFRP and its production can be affordable and environmentally friendly compared to virgin carbon fibre. Accordingly, this can reduce wastage of natural resources and significantly reduce cost in production of fibre reinforced polymer (CFRP) composites.

A major drawback of CFRPs is their reliance of virgin carbon fibres. This is because recycled carbon fibre is mainly used in non-woven forms and the fibres are randomly oriented leading to poor mechanical properties.

Unfortunately, the composites comprising non-woven randomly oriented carbon fibres have inferior mechanical properties such as lower tensile strength compared to using virgin carbon fibre. Additionally, non-woven composites made of filamentous and randomly oriented fibres can only typically achieve a maximum fibre volume fraction (FVF) of 30%-40%. Mechanical properties of aligned woven CFRP such as tensile and compression strength are higher than composites comprising short and randomly oriented fibres.

Techniques such as carding, combing and grilling have been used to improve orientation and alignment of carbon fibres, however these intense mechanical processes can cause severe damage to the rCF. Alternative methods such as ultrasonic, pneumatic, and electric fields for orientation control of fibres have been used, but these methods have generally been limited to very short carbon fibres (less than about 10 mm) or carbon nanotubes.

Carbon fibres have also been aligned using hydrodynamic methods by passing a dispersion of fibres in a viscous liquid through an orifice to partially align the fibres. However, the hydrodynamic method has been limited to very short carbon fibres and the resulting composites have a low fibre volume fraction (FVF) of typically at a maximum of 30-40%.

A survey of the representative patent literature may include three long-expired patents in the name of National Research Development Corporation, namely, U.S. Pat. No. 3,617,437, GB 1 389 498 and U.S. Pat. No. 3,947,535.

U.S. Pat. No. 3,617,437, filed 28 Mar. 1968, and entitled "Process for the manufacture of a composite material having aligned reinforcing fibres", relates to a process for the manufacture of a composite material comprising a matrix containing aligned reinforcing fibres, including the steps of dispersing the fibres in a viscous liquid, passing the dispersion through an orifice so that the fibres are at least partially aligned, and laying the dispersion containing aligned fibres upon a permeable surface moving relative to the orifice at a velocity at least that at which the fibre dispersion leaves the orifice and withdrawing the viscous liquid through the permeable surface by suction sufficiently rapidly for the alignment of the fibres thereon to be maintained.

GB 1 389 498, filed 5 Jan. 1973, and entitled "Composite materials", describes a mat of aligned fibres suitable for impregnating with a matrix to give a composite material made by dispersing the fibres in a liquid, passing the dispersion through a nozzle such that at least 85% of the fibres are aligned within 10 degrees, laying the dispersion on a permeable surface moving relatively to the nozzle at a velocity at least equal that at which the dispersion leaves the nozzle and subjecting the dispersion on the surface to a supra-atmospheric pressure while the opposite side of the permeable surface is at a lower pressure such that the liquid passes through the surface rapidly enough for the fibre alignment to be maintained.

Finally, U.S. Pat. No. 3,947,535, filed 12 Apr. 1974 and entitled "Aligning fibres", describes aligned fibre mats produced by passing a continuously accelerating or decelerating stream of fibre dispersion over a permeable surface and simultaneously withdrawing a limited proportion of the dispersion liquid through the permeable surface to deposit aligned fibres thereon.

Many of the realignment methods discussed above produce composite materials with low fibre volume fraction, making them generally unsuitable for structural applications.

It is therefore desirable to provide a method of aligning fibres having improved mechanical properties such as tensile and compression strength as well as higher fibre volume fraction.

It is an object of the present invention to overcome or ameliorate at least one of the disadvantages of the prior art, or to provide a useful alternative.

SUMMARY OF THE INVENTION

Carbon fibre composites have several advantages including for example high stiffness, high tensile strength, low weight, high chemical resistance, high temperature tolerance and low thermal expansion. Due to these superior properties, carbon fibre composites have been used in aerospace, superstructure of ships, defence, automotive, construction, renewable energy, civil engineering, sports equipment, and an increasing number of consumer and technical applications.

However, the use of recycled carbon fibre having short and discontinuous fibres with random orientations has seen limited applications due to their poor mechanical properties and low fibre volume fraction (FVF) of typically at a maximum of 30-40%. Additionally, previously disclosed methods of aligning carbon fibres have been limited to short fibres.

The present inventor has unexpectedly found that in some embodiments, the use of a hybrid hydromagnetic (combination of using a dispersion of carbon fibres in a viscous liquid and a magnetic field) method can provide relatively precise alignment of recycled carbon fibres for use in composite materials. The methods of the present invention can provide higher fibre volume fraction and may reduce high pressure fibre-to-fibre contact points and preserve fibre length. The present inventor has also developed an alternative shearing element for aligning discontinuous fibres.

In one aspect, the present invention provides a method for aligning discontinuous fibres comprising:
  providing a stream of discontinuous fibres in a dispersion medium;
  applying a shear stress to the dispersion medium to align at least a portion of the discontinuous fibres; and
  disposing the at least a portion of the aligned discontinuous fibres on a substrate thereby providing a layer of substantially aligned discontinuous fibres.

In certain embodiments, the method further comprises a step of passing the stream of discontinuous fibres through a force field to align at least a portion of the discontinuous fibres.

In some embodiments, the present invention provides a dispersion, preferably a homogeneous dispersion of discontinuous fibres in a dispersion medium prior to providing the stream of discontinuous fibres. The dispersion can be prepared using any suitable agitator as described herein, preferably by sonication (such as an ultrasonicator) or stirring (such as magnetic stirring). Advantageously, the present inventor surprisingly found that use of ultrasonication in combination with applying a shear stress provided a higher degree of alignment of discontinuous fibres.

In certain embodiments, the method comprises at least two regions or zones for applying shear stress. In certain embodiments, each region or zone independently applies shear stress to the dispersion medium to align at least a portion of the discontinuous fibres. In preferred embodiments, the method comprises each region sequentially applying shear stress to the dispersion medium align at least a portion of the discontinuous fibres. In preferred embodiments, the method comprises at least a first region or zone and a second region or zone, wherein the shear stress applied to the dispersion medium of the first region or zone is less than the second region or zone.

In some embodiments, the shear stress of the first region or zone is about greater than 90% and less than about 100% of the shear stress of the second region or zone. In some embodiments, the shear stress of the first region or zone is about greater than 80% and less than about 95% of the shear stress of the second region or zone. In some embodiments, the shear stress of the first region or zone is about greater than 70% and less than about 95% of the shear stress of the second region or zone. In some embodiments, the shear stress of the first region or zone is about greater than 60% and less than about 95% of the shear stress of the second region or zone. In some embodiments, the shear stress of the first region or zone is about greater than 50% and less than about 95% of the shear stress of the second region or zone. In some embodiments, the shear stress of the first region or zone is about greater than 40% and less than about 95% of the shear stress of the second region or zone. In some embodiments, the shear stress of the first region or zone is about greater than 30% and less than about 95% of the shear stress of the second region or zone. In some embodiments, the shear stress of the first region or zone is about greater than 20% and less than about 95% of the shear stress of the second region or zone.

In certain embodiments, the shearing element aligns at least about 50% of the discontinuous fibres in the dispersion medium within about 15 degrees in one direction. In certain embodiments, the shearing element aligns at least about 55% of the discontinuous fibres in the dispersion medium within about 15 degrees in one direction. In certain embodiments, the shearing element aligns at least about 60% of the discontinuous fibres in the dispersion medium within about 15 degrees in one direction. In certain embodiments, the shearing element aligns at least about 65% of the discontinuous fibres in the dispersion medium within about 15 degrees in one direction. In certain embodiments, the shearing element aligns at least about 70% of the discontinuous fibres in the dispersion medium within about 15 degrees in one direction. In certain embodiments, the shearing element aligns at least about 75% of the discontinuous fibres in the dispersion medium within about 15 degrees in one direction. In certain embodiments, the shearing element aligns at least about 80% of the discontinuous fibres in the dispersion medium within about 15 degrees in one direction. In certain embodiments, the shearing element aligns at least about 50% of the discontinuous fibres in the dispersion medium within about 10 degrees in one direction. In certain embodiments, the shearing element aligns at least about 55% of the discontinuous fibres in the dispersion medium within about 10 degrees in one direction. In certain embodiments, the shearing element aligns at least about 60% of the discontinuous fibres in the dispersion medium within about 10 degrees in one direction. In certain embodiments, the shearing element aligns at least about 65% of the discontinuous fibres in the dispersion medium within about 10 degrees in one direction. In certain embodiments, the shearing element aligns at least about 70% of the discontinuous fibres in the dispersion medium within about 10 degrees in one direction. In certain embodiments, the shearing element aligns at least about 75% of the discontinuous fibres in the dispersion medium within about 10 degrees in one direction.

In a preferred embodiment, the method comprises providing homogeneously dispersed discontinuous fibres in a dispersion medium prior to providing the stream of discontinuous fibres.

The above method can provide recycling of both short and long discontinuous fibres to be deposited with precise control of a defined orientation and fibre volume fraction when used in a composite material for product applications that require a high grade structural reinforcement.

Advantageously, the above defined method can in some embodiments align long discontinuous fibres. Additionally, the method can provide composite materials having high fibre volume fractions.

In preferred embodiments, the dispersion medium is a viscous liquid. In certain embodiments, the discontinuous fibres are carbon fibres. In certain embodiments, the force field is selected from the group consisting of a magnetic field, an electric field, an electromagnetic field and combinations thereof.

In another aspect, the present invention provides discontinuous fibres aligned by the method defined above. In various embodiments, the aligned fibres can be applied in composite materials as described below.

In another aspect, the present invention provides a method for realigning recycled short fibres for manufacturing of carbon fibre reinforced polymer (CFRP) composites, the method comprising:
  dispersing recycled short fibres of CFRP in a viscous liquid carrier;
  passing the resulting dispersion through a shearing element through a velocity gradient against the suspension stream; and
  depositing aligned short fibres of CFRP on a permeable surface, thereby to at least partly remove the viscous liquid carrier.

In certain embodiments, the shearing element is a convergent nozzle. In certain embodiments, the method further comprises passing the resulting fibre stream through a force field.

In a preferred embodiment, the method comprises providing homogeneously dispersed recycled short fibres of CFRP in a viscous liquid carrier prior to providing the stream of discontinuous fibres.

The method defined above can provide realignment of both short and long discontinuous carbon fibres of CFRP to be deposited with precise control of a defined orientation and fibre volume fraction. This can provide remanufacture (by recycling) or manufacturing of composites using short and discontinuous fibres for high grade structural reinforcement.

Advantageously, the method defined above can in some embodiments align long discontinuous fibres. Additionally, the method of the present invention can provide composite materials having high fibre volume fractions.

In preferred embodiments, the dispersion medium is a viscous liquid. In certain embodiments, the discontinuous fibres are carbon fibres. In certain embodiments, the force field is selected from the group consisting of a magnetic field, an electric field, an electromagnetic field and combinations thereof.

In another aspect, the present invention provides CFRP composites comprising aligned short fibres, when aligned by the above-defined method. In various embodiments, the aligned fibres can be applied in composite materials as described below.

In another aspect, the present invention provides a composite material comprising:
  a binder and substantially aligned discontinuous fibres;
  wherein the composite material has a fibre volume fraction greater than about 40%.

In certain embodiments, the composite material has a fibre volume fraction greater than about 45%, greater than about 50%, greater than about 55%, greater than about 60% or greater than about 70%. In preferred embodiments, the composite material has a fibre volume fraction between about 50 and about 60%.

Advantageously, the composite materials of the present invention have high fibre volume fractions and can be used in applications requiring light weight or sustainable and cost-effective applications as less material (for example carbon fibre) is used. In some embodiments, the composite materials have a fibre volume fraction between about 50 and about 60%.

In yet another aspect, the present invention provides a composite material comprising:
  a binder and substantially aligned discontinuous fibres;
  wherein at least about 50% of the discontinuous fibres in the composite material are aligned within about 15 degrees in one direction.

In certain embodiments, at least about 55% of the discontinuous fibres are aligned in the composite material within about 15 degrees in one direction. In certain embodiments, at least about 60% of the discontinuous fibres are aligned in the composite material within about 15 degrees in one direction. In certain embodiments, at least about 65% of the discontinuous fibres in the composite material are aligned within about 15 degrees in one direction. In certain embodiments, at least about 70% of the discontinuous fibres in the composite material are aligned within about 15 degrees in one direction. In certain embodiments, at least about 75% of the discontinuous fibres in the composite material are aligned within about 15 degrees in one direction. In certain embodiments, at least about 50% of the discontinuous fibres in the composite material are aligned within about 10 degrees in one direction. In certain embodiments, at least about 55% of the discontinuous fibres in the composite material are aligned within about 10 degrees in one direction. In certain embodiments, at least about 60% of the discontinuous fibres in the composite material are aligned within about 10 degrees in one direction. In certain embodiments, at least about 65% of the discontinuous fibres in the composite material are aligned within about 10 degrees in one direction. In certain embodiments, at least about 70% of the discontinuous fibres in the composite material are aligned within about 10 degrees in one direction. In certain embodiments, at least about 75% of the discontinuous fibres in the composite material are aligned within about 10 degrees in one direction. In certain embodiments, at least about 80% of the discontinuous fibres in the composite material are aligned within about 10 degrees in one direction. In certain embodiments, at least about 90% of the discontinuous fibres in the composite material are aligned within about 10 degrees in one direction. In certain embodiments, at least about 90% of the discontinuous fibres in the composite material are aligned within about 5 degrees in one direction. In preferred embodiments, at least about 90% of the discontinuous fibres in the composite material are aligned within about 1.5 degrees in any one direction.

The aligned discontinuous fibres of the present invention can enable production of composite materials with a relatively high fibre volume fraction and distribution of stress in a desired direction in the composite.

In another aspect, the present invention provides a fibre aligning apparatus comprising:

a shearing element for applying a shear stress to the dispersion medium having an inlet for receiving a stream of discontinuous fibres in a dispersion medium and an outlet; such that in use, the stream of discontinuous fibres undergoes shear stress thereby providing substantially aligned discontinuous fibres.

In certain embodiments, the fibre aligning apparatus further comprises a force field element associated with the shearing element for aligning at least a portion of the discontinuous fibres such that in use, the stream of discontinuous fibres undergoes shear stress and interact with a force field of the force field element thereby providing substantially aligned discontinuous fibres.

The method of the present invention can be performed using a fibre aligning apparatus. The fibre aligning apparatus can be used in a hybrid hydromagnetic fibre alignment machine (HMFAM).

In certain embodiments, the fibre aligning apparatus can comprise a container for storing a dispersion of discontinuous fibres. In certain embodiments, the container homogeneously disperses the discontinuous fibres in a dispersion medium. In use, a stream of the dispersion comprising discontinuous fibres can be formed as it passes through the inlet of the shearing element or a flow stabiliser section/channel prior to the inlet of the shearing element. It should be appreciated by a skilled addressee that the container can take any geometry or size depending on the amount of dispersion to be stored. If the dispersion is to be stored in the container for long periods of time, the container can comprise an agitator.

Any suitable agitator can be used, such as an impeller, high-speed stirrer, sonicator, mixing rod, homogenizer, sonolator, micro-fluidizer, Turello change can mixer, rotator, Ross mixer, or Eppenbach colloid mill. Where appropriate, hand mixing can also be used. In certain embodiments, a high-speed stator-rotor stirrer. Alternatively, the dispersion can be sonicated (for example, the container can be a sonicator or comprise a sonicator).

To assist with fluid flow of the dispersion of discontinuous fibres, the dispersion of discontinuous fibres can comprise a pre-treatment step. In these embodiments, the pre-treatment step comprises freezing and thawing the dispersion or freezing and heating the dispersion. In preferred embodiments, the pre-treatment step comprises freezing and thawing the dispersion. In some embodiments, the dispersion can be cooled or heated by the container. In some embodiments, the dispersion of discontinuous fibres is cooled to a temperature below 0° C., between about −196° C. and about −10° C., between about −80° C. and about −10° C., between about −20° C. and about −10° C., preferably cooled to a temperature at about −10° C. In these embodiments, the frozen dispersion of discontinuous fibres can then be transferred to the container which is heated to a temperature less than 100° C. In some embodiments, the container can be optionally frozen and heated to a temperature of between about 10° C. and about 100° C., between about 10° C. and about 80° C., preferably between about 20° C. and about 60° C., yet more preferably between about 20° C. and about 40° C. As would be appreciated, freezing and/or heating of the dispersion can also be performed directly in the container such as placing the container comprising the dispersion of discontinuous fibres in a freezer and/or heater.

In some embodiments, the temperature of the dispersion is between about 10° C. and about 100° C., between about 10° C. and about 80° C., preferably between about 20° C. and about 60° C., yet more preferably between about 20° C. and about 40° C., most preferably about 30° C.

In some embodiments, the dispersion of discontinuous fibres can be agitated continuously. In some embodiments, the dispersion of discontinuous fibres is agitated for a duration of between about 5 seconds to about 3 hours, between about 5 seconds to about 2 hours, between about 5 seconds to about 1 hour, between about 5 seconds to about 30 minutes, between about 5 seconds to about 20 minutes, between about 5 seconds to about 15 minutes, between about 5 seconds to about 10 minutes, between about 5 seconds to about 5 minutes, between about 5 seconds to about 60 seconds, between about 30 seconds to about 120 seconds, preferably between about 30 seconds to about 60 seconds, preferably between about 10 seconds to about 50 seconds, more preferably between about 10 seconds to about 40 seconds, more preferably between 20 seconds to about 40 seconds, most preferably about 30 seconds prior to providing a stream of discontinuous fibres.

The container can be connected to the fibre aligning apparatus or can be integral to the fibre aligning apparatus.

In preferred embodiments, the shearing element and force field element are positioned sequentially and preferably the force field element is connected at the outlet of the shearing element. As such, in use, the stream of discontinuous fibres undergoes shear stress and subsequently interacts with the force field of the force field element to provide substantially aligned discontinuous fibres.

However, it should be appreciated that the fibre aligning apparatus can have alternative configurations. In certain embodiments, the force field element is connected to the inlet of the shearing element. In this configuration, in use, the stream of discontinuous fibres interacts with the force field of the force field element and subsequently undergoes shear stress to provide substantially aligned discontinuous fibres.

In another embodiment, the force field element and shearing element are co-located. In this configuration, in use, the stream of discontinuous fibres undergoes shear stress and interacts with the force field of the force field element simultaneously to provide substantially aligned discontinuous fibres.

The force field element and shearing element can be configured modularly for easy connection and configuration. In some embodiments, the force field element and shearing element are integrally connected.

The shearing element can have any suitable geometry to provide a shear stress to the dispersion medium. The shearing element can be tapered which can provide the shear stress to the dispersion medium due to the Venturi effect. For example, the shearing element can be conically or frusto-conically shaped. In some embodiments, the shearing element is a nozzle, syringe or a slit. In preferred embodiments, the shearing element is a slit. The diameter of the outlet of the shearing element can be between about 1 and about 15 mm, 1 and about 10 mm, between about 1 and about 8 mm, between about 1 and about 5 mm, between about 1 and about 3 mm, preferably between about 5 mm and 15 mm, between about 8 and 15 mm, more preferably between 8 and 12 mm, yet more preferably about 10 mm. In certain embodiments, the diameter of the outlet is less than the average ($d_{50}$) length of the aligned discontinuous fibres.

In certain embodiments, the slit has a contoured surface, preferably a convex surface, in the direction of flow of the stream of discontinuous fibres to minimise obstruction of the fibre alignment.

In certain embodiments, the shearing element comprises at least two regions for sequentially applying shear stress to the dispersion medium to align at least a portion of the discontinuous fibres. In certain embodiments, the shearing element comprises a first region having at least one ramp surface for aligning at least a portion of the discontinued fibres and a second region having at least two convergent surfaces for aligning at least a portion of the discontinued fibres. In certain embodiments, the shearing element comprises at least one ramp surface on a first plane for aligning at least a portion of the discontinued fibres and at least two convergent surfaces on a second plane for aligning at least a portion of the discontinued fibres.

In some embodiments, the shearing element comprises two, three, four or five ramp surfaces. In a preferred embodiment, the shearing element comprises one ramp surface.

In some embodiments, the shearing element comprises three, four, five or six convergent surfaces. In a preferred embodiment, the shearing element comprises two convergent surfaces.

The shear stress applied on the dispersion medium by the shearing element can be a result of a velocity gradient formed across the stream, for example, the velocity gradients formed across the stream by the at least one ramp surface and the at least two convergent surfaces.

As would be appreciated by a skilled addressee, any suitable angle of the at least one ramp surface can be used relative to the direction of the stream of discontinuous fibres. In certain embodiments, the angle of the ramp surface is between about 5 to about 90 degrees relative to the direction of the stream of discontinuous fibres. In certain embodiments, the angle of the ramp surface is between about 5 to about 80 degrees relative to the direction of the stream of discontinuous fibres. In certain embodiments, the angle of the ramp surface is between about 5 to about 70 degrees relative to the direction of the stream of discontinuous fibres. In certain embodiments, the angle of the ramp surface is between about 5 to about 60 degrees relative to the direction of the stream of discontinuous fibres. In certain embodiments, the angle of the ramp surface is between about 5 to about 50 degrees relative to the direction of the stream of discontinuous fibres. In certain embodiments, the angle of the ramp surface is between about 5 to about 40 degrees relative to the direction of the stream of discontinuous fibres. In certain embodiments, the angle of the ramp surface is between about 5 to about 35 degrees relative to the direction of the stream of discontinuous fibres. In certain embodiments, the angle of the ramp surface is between about 10 to about 30 degrees relative to the direction of the stream of discontinuous fibres. In certain embodiments, the angle of the ramp surface is between about 15 to about 25 degrees relative to the direction of the stream of discontinuous fibres. In preferred embodiments, the angle of the ramp surface is between about 20 degrees relative to the direction of the stream of discontinuous fibres.

As would be appreciated by a skilled addressee, any suitable angle of the at least one ramp surface on a first plane can be used relative to the at least two convergent surfaces on a second plane. In certain embodiments, the angle between the first plane and the second plane is between about 5 to about 90 degrees. In certain embodiments, the angle between the first plane and the second plane is between about 5 to about 80 degrees. In certain embodiments, the angle between the first plane and the second plane is between about 5 to about 70 degrees. In certain embodiments, the angle between the first plane and the second plane is between about 5 to about 60 degrees. In certain embodiments, the angle between the first plane and the second plane is between about 5 to about 50 degrees. In certain embodiments, the angle between the first plane and the second plane is between about 5 to about 40 degrees. In certain embodiments, the angle between the first plane and the second plane is between about 5 to about 30 degrees. In certain embodiments, the angle between the first plane and the second plane is between about 10 to about 30 degrees. In certain embodiments, the angle between the first plane and the second plane is between about 15 to about 30 degrees. In preferred embodiments, the angle between the first plane and the second plane is between about 20 to about 30 degrees, more preferably between about 20 to about 25 degrees.

In certain embodiments, the at least one ramp surface can be substantially planar, convex or concave. In preferred embodiments, the ramp surface is concave.

In certain embodiments, the at least two convergent surfaces are independently substantially planar, convex or concave. In preferred embodiments, the at least two convergent surfaces are convex.

As would be appreciated by a skilled addressee, in certain embodiments, the radius of curvature of the ramp surface and/or convergent surface can be adjusted to minimise the turbulence of the flow of discontinuous fibres. In these embodiments, this can advantageously improve the alignment of the discontinuous fibres as the fibres as less disturbed in the stream.

In certain embodiments, the radius of curvature of the ramp surface is between about 2 to 60 degrees, between about 2 to 55 degrees, between about 2 to 45 degrees, between about 2 to 30 degrees, between about 2 to 25 degrees, between about 5 to 25 degrees, between about 5 to 20 degrees, between about 10 to 20 degrees, between about 15 to 50 degrees, between about 15 to 45 degrees, between about 15 to 30 degrees, preferably about 15 degrees.

In certain embodiments, the radius of curvature of each convergent surface is independently between about 2 to 60 degrees, between about 2 to 55 degrees, between about 2 to 45 degrees, between about 2 to 30 degrees, between about 2 to 25 degrees, between about 5 to 25 degrees, between about 5 to 20 degrees, between about 10 to 20 degrees, preferably about 15 degrees. In preferred embodiments, each convergent surface has substantially the same radius of curvature, more preferably the same radius of curvature.

In certain embodiments, the fibre aligning apparatus comprises a plurality of shearing elements. In some embodiments, the fibre aligning apparatus comprises two, three, four, five, six, seven, eight, nine or ten shearing elements.

In certain embodiments, the fibre aligning apparatus comprises a plurality of force field elements. In some embodiments, the fibre aligning apparatus comprises two, three, four, five, six, seven, eight, nine or ten force field elements.

In certain embodiments, the force field element is a magnetic field generator, electric field generator or an electromagnetic field generator. In some embodiments, the force field element is selected from the group consisting of a magnet, charged plates, electromagnet and combinations thereof, for example, a hydromagnetic field.

In certain embodiments, the fibre aligning apparatus comprises a substrate for receiving the aligned discontinuous fibres. The substrate can in certain embodiments move two-dimensionally perpendicular to the direction of flow of the stream of discontinuous fibres. In some embodiments, the substrate can move at a rate such that the dispersion medium can be removed while leaving the aligned discontinued fibres on the substrate surface.

In other embodiments, the substrate can be a rotating drum or belt such that the aligned discontinued fibres are deposited on the surface of the rotating drum or belt. The rotating drum or belt can rotate at an angular velocity such that the dispersion medium can be removed while leaving the aligned discontinued fibres on the substrate surface. In some embodiments, the aligned fibres can be deposited using centrifugal electrospinning.

In preferred embodiments, the substrate is a permeable substrate. The permeable substrate can be any suitable material which can receive the aligned discontinuous fibres. The permeable substrate can be selected from the group consisting of a gauze (for example, a metal gauze, a flexible porous gauze such as nylon gauze supported on a wire mesh), textile fabric such as absorbent cotton wool, rigid filter substrate (for example, a sintered glass or metal plate) or porous polyethylene sheet. It is preferable that the diameter of the pores of the substrate is smaller than the average ($d_{50}$) length of the aligned discontinuous fibres so that it presents low impedance to the flow of dispersion medium through the substrate or to minimise loss of aligned discontinuous fibres which can inadvertently pass through the pores of the permeable substrate.

It can be appreciated that rapid removal of the dispersion medium from the deposited layer of aligned discontinuous fibres can minimise misalignment and loss of alignment as a result of diffusion, dispersion medium-fibre interactions or fibre-fibre interactions.

When the substrate is a permeable substrate, the dispersion medium can be removed by applying a pressure difference between the permeable substrate such as under reduced pressure (suction) or by applying pressure. For example, a pressure difference can be provided across the permeable substrate to remove the dispersion medium wherein the reduced pressure is on the opposite side to that of the deposited aligned discontinuous fibre surface of the permeable substrate. Alternatively, pressure may be applied to the opposite side of the deposited aligned discontinuous fibre surface of the permeable substrate by enclosing the shearing element and at least part of the substrate in an air-tight seal and continuously supplying with pressurized gas (greater than 1 atmosphere) using a pump (such as a rotary pump) or from a gas cylinder.

In some embodiments, the substrate can be heated directly or by the surrounding environment to promote evaporation of the dispersion medium. In some embodiments, the substrate can be exposed to the surrounding ambient environment to promote evaporation of the dispersion medium. In other embodiments, a stream of gas such as air can be flowed over the surface of the permeable substrate to promote evaporation of the dispersion medium. Advantageously, non-permeable substrates can be used if the removal of the dispersion medium is by heating or gas.

It should be appreciated that removal of the dispersion medium should not exert excessive forces which may be damage or substantially misalign the disposed discontinuous fibres. In certain embodiments, excessive or insufficient distance of the shearing element to the permeable surface can cause fibre misalignment, wherein the aligned discontinuous fibres from the outlet of the shearing element can contact the permeable substrate surface and increase the risk of disrupting previously disposed aligned discontinuous fibres. Preferably, the length of the discontinuous fibre is less than the distance between the shearing element and permeable substrate surface. In some embodiments, the distance between the shearing element and permeable substrate surface is less than 10 cm, less than 5 cm and more preferably less than 2 cm.

In certain embodiments, the permeable substrate can comprise a recovery system. The recovery system can capture any excess discontinuous fibres which pass through the permeable substrate as well as the used dispersion medium back to the container. Advantageously, this can minimise wastage of the fibres and dispersion medium and reduce costs by recycling the materials of the method of the present invention.

In yet another aspect, the present invention provides a shearing element as described herein. In certain embodiments, the present invention provides a shearing element for aligning discontinuous fibres comprising: an inlet for receiving a stream of discontinuous fibres in a dispersion medium and an outlet; wherein the shearing element comprises at least two regions for sequentially applying shear stress to the dispersion medium to align at least a portion of the discontinuous fibres. In certain embodiments, the inlet of the shearing element is adapted to be connected to a flow stabiliser section or channel. In these embodiments, the flow stabiliser section or channel reduces the amount of turbulent flow of the stream of discontinuous fibres prior to passing through the shearing element. In certain embodiments, the flow stabiliser section can be integrally connected to the shearing element or connected by component parts.

Definitions

In describing and claiming the present invention, the following terminology will be used in accordance with the definitions set out below. It is also to be understood that the terminology used herein is for the purpose of describing particular embodiments of the invention only and is not intended to be limiting. Unless defined otherwise, all technical and scientific terms used herein have the same meaning as commonly understood by one having ordinary skill in the art to which the invention pertains.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising", "consisting of", and "consisting essentially of", where one of these three terms is used herein, the presently disclosed and claimed subject matter may include the use of either of the other two terms. Thus, in some embodiments not otherwise explicitly recited, any instance of "comprising" may be replaced by "consisting of" or, alternatively, by "consisting essentially of".

Other than in the operating examples, or where otherwise indicated, all numbers expressing quantities of ingredients or reaction conditions used herein are to be understood as modified in all instances by the term "about", having regard to normal tolerances in the art. The examples are not intended to limit the scope of the invention. In what follows, or where otherwise indicated, "%" will mean "weight %", "ratio" will mean "weight ratio" and "parts" will mean "weight parts".

The term "substantially" as used herein shall mean comprising more than 50% by weight, where relevant, unless otherwise indicated.

The recitation of a numerical range using endpoints includes all numbers subsumed within that range (e.g., 1 to 5 includes 1, 1.5, 2, 2.75, 3, 3.80, 4, 5, etc.).

The terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

It must also be noted that, as used in the specification and the appended claims, the singular forms "a", "an" and "the" include plural referents unless the context clearly dictates otherwise.

The prior art referred to herein is fully incorporated herein by reference.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

As defined herein, the term "force field" refers to a vector field that describes a non-contact force acting on an object such as a discontinuous fibre at various positions in space, excluding gravitation fields. Force fields can refer to, for example, an electric field, magnetic field or electromagnetic field.

As defined herein, the term "fibre volume fraction" refers to the percentage of fibre volume in the entire volume of a fibre-reinforced composite material.

As defined herein, the term "discontinuous fibres" refers to fibres or filaments having a defined fibre length of less than 10 cm.

BRIEF DESCRIPTION OF THE DRAWINGS

A preferred embodiment(s) of the invention will now be described, by way of example only, with reference to the accompanying drawings(s) in which:

FIG. 4 shows a further alternative fibre alignment apparatus (without a force field element)—a) side view; and b) top view.

FIG. 5 shows exemplary embodiments of the components of a fibre aligning apparatus of FIG. 4.

FIG. 9 shows some of the results obtained using the inventive method. In particular.

DETAILED DESCRIPTION OF THE INVENTION

Figure 1:
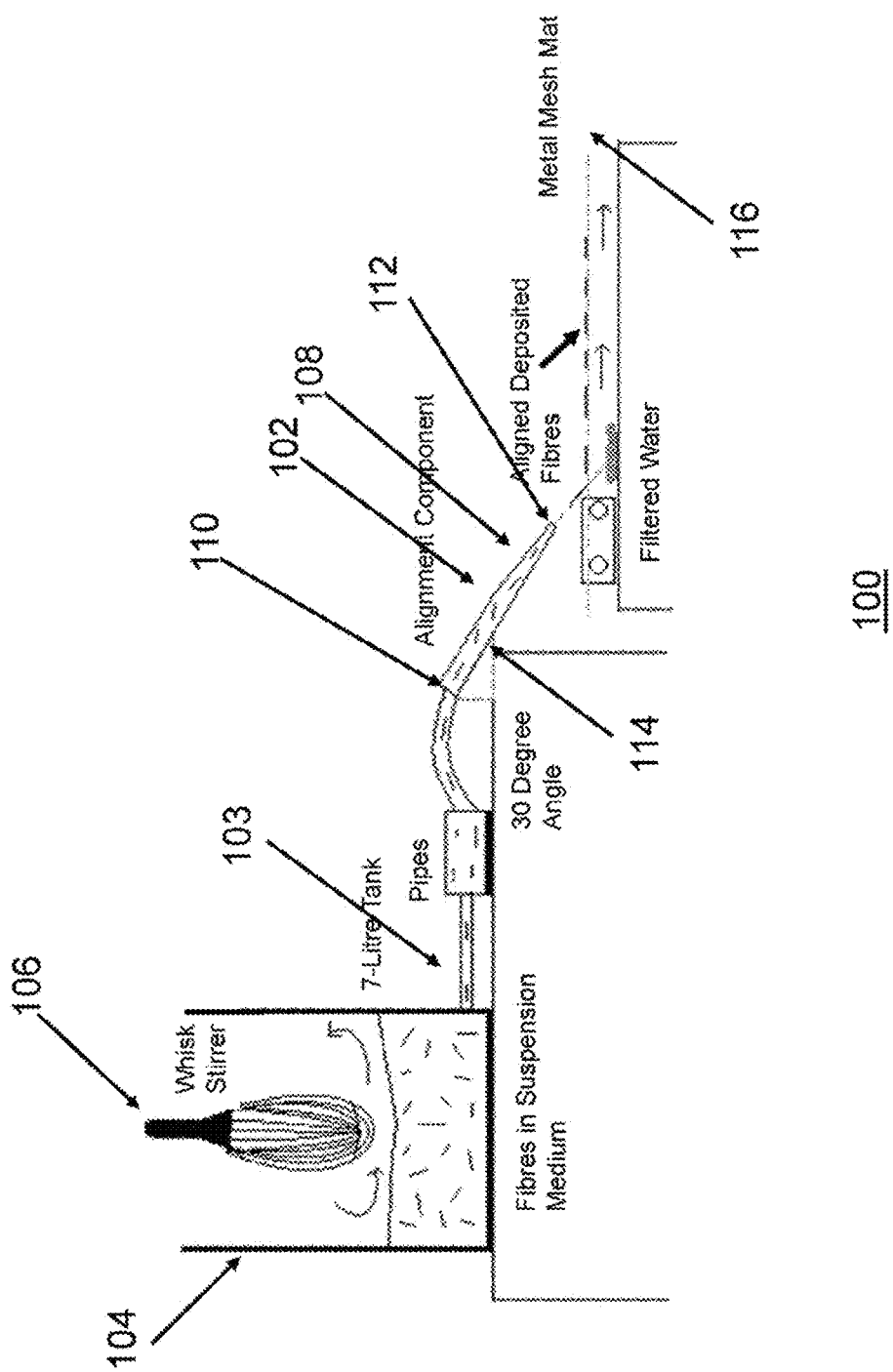
FIG. 1 shows a schematic of a hybrid hydromagnetic fibre alignment apparatus of Example 1. It will be appreciated that the 30 degree angle, as shown, is exemplary only, as is the whisk stirrer (a magnetic, or other types of stirrer are equally applicable). Finally, the metal mesh, as drawn, is more appropriately a collecting mesh.

The skilled addressee will understand that the invention comprises the embodiments and features disclosed herein as well as all combinations and/or permutations of the disclosed embodiments and features.

The present inventor has developed a method for alignment of discontinuous fibres for use in aerospace, superstructure of ships, defence, automotive, construction, renewable energy, civil engineering, sports equipment, and an increasing number of consumer and technical applications.

The method of the present invention can be readily scaled up for industrial scale production of aligned discontinuous fibres. Advantageously, the method of the present invention does not chemically react or affect the pH of the discontinuous fibres which minimises damage to the fibres. Further, the present invention provides cost efficiency by avoiding the use of expensive equipment such as using the conventional centrifugal alignment method.

A method for aligning discontinuous fibres is now described according to one aspect of the present invention. Accordingly, the present invention provides a method for aligning discontinuous fibres comprising: providing a stream of discontinuous fibres in a dispersion medium (i.e., as a dispersion); applying a shear stress to the dispersion medium to align at least a portion of the discontinuous fibres; and disposing the at least a portion of the aligned discontinuous fibres on a substrate thereby providing a layer of substantially aligned discontinuous fibres.

The method of the present invention can provide recycling of both short and long discontinuous fibres to be deposited with precise control of a defined orientation and fibre volume fraction when used in a composite material for product applications that require a high grade structural reinforcement.

Advantageously, the method of the present invention can in some embodiments align long discontinuous fibres (for example up to about 10 cm; more preferably about 25-30 mm) with improved degree of fibre alignment compared to conventional hydrodynamic methods by reducing the misalignment as a result of extrusion. Additionally, the method of the present invention can provide composite materials having high fibre volume fractions.

In a preferred embodiment, the method comprises providing homogeneously dispersed discontinuous fibres in a dispersion medium prior to providing the stream of discontinuous fibres.

As would be appreciated by a skilled addressee, any suitable discontinuous fibre can be used which can form aligned fibres using the method of the present invention. In some embodiments, the fibres will be reinforcing fibres intended to improve the mechanical properties of a composite material such as tensile strength and stiffness.

In certain embodiments, the discontinuous fibre is selected from the group consisting of a carbon, glass, asbestos, silicon carbide, silicon nitride, polymer and combinations thereof. The polymers can be natural or synthetic. In certain embodiments, the discontinuous fibres are carbon fibres.

Natural polymers may include polysaccharides, polypeptides, glycoproteins, and derivatives thereof and copolymers thereof. Polysaccharides may include agar, alginates, chitosan, hyaluronan, cellulosic polymers (e.g., cellulose and derivatives thereof as well as cellulose production by-products such as lignin) and starch polymers. Polypeptides may include various proteins, such as silk fibroin, lysozyme, collagen, keratin, casein, gelatin and derivatives thereof. Derivatives of natural polymers, such as polysaccharides and polypeptides, may include various salts, esters, ethers, and graft copolymers. Exemplary salts may be selected from sodium, zinc, iron and calcium salts.

Synthetic polymers may include vinyl polymers such as, but not limited to, polyethylene, polypropylene, poly(vinyl chloride), polystyrene, polytetrafluoroethylene, poly(α-methylstyrene), poly(acrylic acid), poly(methacrylic acid), poly(isobutylene), poly(acrylonitrile), poly(methyl acrylate), poly(methyl methacrylate), poly(acrylamide), poly(methacrylamide), poly(1-pentene), poly(1,3-butadiene), poly(vinyl acetate), poly(2-vinyl pyridine), poly(vinyl alcohol), poly(vinyl pyrrolidone), poly(styrene), poly(styrene sulfonate), poly(vinylidene hexafluoropropylene), 1,4-polyisoprene, and 3,4-polychloroprene. Suitable synthetic polymers may also include non-vinyl polymers such as, but not limited to, poly(ethylene oxide), polyformaldehyde, polyacetaldehyde, poly(3-propionate), poly(10-decanoate), poly(ethylene terephthalate), polycaprolactam, poly(11-undecanoamide), poly(hexamethylene sebacamide), poly(m-phenylene terephthalate), poly(tetramethylene-m benzenesulfonamide). Copolymers of any one of the aforementioned may also be used.

Synthetic polymers employed in the method of the invention may fall within one of the following polymer classes: polyolefins, polyethers (including all epoxy resins, polyacetals, poly(orthoesters), polyetheretherketones, polyetherimides, poly(alkylene oxides) and poly(arylene oxides)), polyamides (including polyureas), polyamideimides, polyacrylates, polybenzimidazoles, polyesters (e.g. polylactic acid (PLA), polyglycolic acid (PGA), poly(lactic-co-glycolic acid) (PLGA)), polycarbonates, polyurethanes, polyimides, polyamines, polyhydrazides, phenolic resins, polysilanes, polysiloxanes, polycarbodiimides, polyimines (e.g. polyethyleneimine), azo polymers, polysulfides, polysulfones, polyether sulfones, oligomeric silsesquioxane polymers, polydimethylsiloxane, polymers and copolymers thereof.

In some embodiments, functionalised synthetic polymers may be used. In such embodiments, the synthetic polymers may be modified with one or more functional groups. Examples of functional groups include boronic acid, alkyne or azido functional groups. Such functional groups will generally be covalently bound to the polymer. The functional groups may impart additional properties to the fibres (for example introducing charged species such that the polymer has a net positive or net negative charge).

In certain embodiments, the dispersion medium is a viscous liquid. It was surprisingly found that the use of a dispersion medium having a high viscosity improved alignment when used in the method of the invention.

It will be apparent to a person skilled in the relevant art that any suitable solvent can be used as the dispersion medium to form a dispersion of discontinuous fibres. In certain embodiments, the dispersion medium is an aqueous solution or an organic solvent. In one embodiment, the dispersion medium is water, organic solvent, inorganic non-aqueous solvent and combinations thereof. In preferred embodiments, the dispersion medium is selected from the group consisting of water, glycerine, glycerol, cellulose ether and combinations thereof.

Suitable organic solvents can be selected from the group consisting of pentane, cyclopentane, hexane, cyclohexane, benzene, toluene, 1,4-dioxane, chloroform, diethyl ether, dichloromethane, tetrahydrofuran, ethyl acetate, acetone, dimethyl formamide, acetonitrile, dimethyl sulfoxide, nitromethane, propylene carbonate, n-butanol, isopropanol, n-propanol, ethanol, methanol, formic acid, acetic acid, hexafluoroisopropanol, trifluoroacetic acid and combinations thereof.

Suitable inorganic solvents can be selected from the group consisting of liquid ammonia, liquid sulfur dioxide, sulfuryl chloride, sulfuryl chloride fluoride, phosphoryl chloride, dinitrogen tetroxide, antimony trichloride, bromine pentafluoride, hydrogen fluoride, neat sulfuric acid, hydrochloric acid, nitric acid, phosphoric acid, boric acid, hydrofluoric acid, hydrobromic acid, perchloric acid, hydroiodic acid and combinations thereof.

In certain embodiments, the dispersion of discontinuous fibres can include a mixture of two or more miscible solvents such as a mixture of water and an aqueous soluble solvent, a mixture of two or more organic solvents, or a mixture of an organic and an aqueous soluble solvent.

The viscosity of the dispersion medium can be adjusted depending on the dispersion medium and temperature used in the method of the invention. In embodiments of the method, the dispersion medium has a viscosity in the range of from about 0.5 to about 5000 centiPoise, in the range of from about 1 to about 2000 cP, in the range of from about 0.5 to about 1000 cP, preferably from about 0.5 to about 200 cP, yet more preferably from about 0.5 to about 50 cP, yet more preferably in the range of from about 0.5 to about 30 cP, most preferably from about 0.5 to about 15 cP. In some embodiments, the dispersion medium has a viscosity of 0.890 cP.

The viscosity of the dispersion medium may be determined using conventional techniques. For example, dynamic viscosity measurement may be obtained with a Bohlin Visco or a Brookfield system. The viscosity of the dispersion medium may also be extrapolated from literature data, such as that reported in the CRC Handbook of Chemistry and Physics, 91st edition, 2010-2011, published by CRC Press.

The amount of discontinuous fibres dispersed in a dispersion medium can be any suitable amount and a person skilled in the relevant art would appreciate that the amount dispersed can depend on the effectiveness of the method of the invention in aligning the discontinuous fibres. In certain embodiments, the dispersion medium comprises discontinuous fibres in an amount of from about 0.001% to about 35% w/w, in an amount of from about 0.01% to about 20% w/w, in an amount of from about 0.01% to about 25% w/w, more preferably in an amount of from about 0.01% to about 15% w/w, yet more preferably in an amount of from about 0.01% to about 10% w/w and most preferably in an amount of from about 0.01% to about 5% w/w. In some embodiments, the dispersion medium comprises discontinuous fibres in an amount of between about 0.0005% to about 0.005% w/w, between about 0.001% to about 0.003% w/w, preferably about 0.001% w/w. In some embodiments, the dispersion medium comprises discontinuous fibres in an amount of between about 0.0005% to about 0.005% w/w, between about 0.001% to about 0.003% w/w, preferably about 0.001% w/w. between about 0.2% w/w.

In certain embodiments, the force field is selected from the group consisting of a magnetic field, an electric field, an electromagnetic field and combinations thereof. In preferred embodiments, the force field is an electromagnetic field.

Without being bound by any one theory, it is believed that even non-magnetic discontinuous fibres can be aligned by a magnetic or electromagnetic field when used in the present invention as the discontinuous fibres can comprise a dipole moment or a net charge (positive or negative) such that a Lorentz force can interact with the discontinuous fibres.

The method of the invention can align long discontinuous fibres compared to conventional alignment techniques. In one embodiment, the discontinuous fibres have a length of less than about 10 cm, less than about 5 cm, less than about 30 mm, preferably less than about 20 mm, preferably less than 15 mm, yet more preferably less than about 10 mm. In some embodiments, the discontinuous fibres have a length of between about 1 mm and about 10 cm, between about 1 mm and about 5 cm, between about 1 mm and about 30 mm, preferably between about 2 and about 20 mm, preferably between about 5 and about 15 mm, yet more preferably between about 2 and about 10 mm, preferably between about 5 and about 10 mm and most preferably about 5 mm.

In certain embodiments, the discontinuous fibres have a diameter of between about 10 nm and about 3 mm, between about 50 nm and about 3 mm, between about 100 nm and about 2 mm, preferably between about 1 μm and about 2 mm and more preferably between about 1 μm and about 1 mm. In some embodiments, the discontinuous fibres have a diameter of between about 5 and about 10 μm.

As would be appreciated by a relevant person skilled in the art, any suitable flow rate of the stream of discontinuous fibres can be used which can provide sufficient time for the discontinuous fibres to align. In certain embodiments, the stream of discontinuous fibres has a flow rate of between about 1 and about 20 mL/min, between about 1 and about 10 mL/min, preferably between about 1 and about 5 mL/min.

In certain embodiments, the velocity (i.e., injection velocity at the inlet of the shearing element) of the stream of discontinuous fibres flowing through the shearing element is between about 0.1 to about 5 m/s, between about 0.1 to about 4 m/s, between about 0.1 to about 3 m/s, between about 0.1 to about 2 m/s, between about 0.1 to about 1 m/s, between about 0.1 to about 0.8 m/s, between about 0.1 to about 0.5 m/s, between about 0.3 to about 0.5 m/s, preferably about 0.4 m/s.

The degree of alignment of discontinuous fibres by the shearing element can be controlled by the shear stress rate applied to the dispersion medium. The shear stress can be controlled by a number of factors including the viscosity of the dispersion medium used and the geometry of the shearing element.

In the method of the present invention, the shear stress applied to the dispersion medium in either or both the first and second regions or zones of the shearing element includes applying a shear stress between about 100 and about 300000 cP/sec, between about 100 and about 200000 cP/sec, between about 100 and about 100000 cP/sec, between about 100 and about 90000 cP/sec, between about 100 and about 80000 cP/sec, between about 100 and about 70000 cP/sec, between about 100 and about 60000 cP/sec, between about 100 and about 50000 cP/sec, between about 100 and about 40000 cP/sec, between about 100 and about 30000 cP/sec, between about 100 and about 20000 cP/sec, between about 100 and about 10000 cP/sec, or between about 100 and about 5000 cP/sec, (1 cP=0.001 N s/m$^2$=1 mPa·s).

For a Newtonian fluid flowing within a tubular shearing element (such as a nozzle or syringe), the shear rate can be calculated using Equation 1:

$$\gamma = 8v/d \quad \text{(Equation 1)}$$

where γ is the shear rate, measured in reciprocal seconds; v is the linear fluid velocity; d is the inside diameter of the shearing element (i.e., the diameter of a nozzle or syringe).

The linear fluid velocity u is related to the volumetric flow rate Q by Equation 2:

$$v = Q/A \quad \text{(Equation 2)}$$

where A is the cross-sectional area of the shearing element such as the diameter of the nozzle or syringe.

Substituting A=πr$^2$ (cross-sectional area of a tubular shearing element such as a nozzle or syringe where r is the radius) into the above into Equation 1 for the shear rate of a Newtonian fluid flowing within a tubular shearing element, and noting (in the denominator) that d=2r, gives:

$$\gamma = 4Q/\pi r^3.$$

For a Newtonian fluid wall, shear stress (τ) can be related to shear rate by τ=μγ, where μ is the dynamic viscosity of the fluid (i.e., dispersion medium).

In some embodiments, the shear stress is between about 0.5 and about 5 Pa, between about 0.5 and about 3 Pa, between about 0.5 and about 2 Pa, preferably 1.1 Pa.

As would be appreciated by a skilled addressee, the viscosity of the dispersion medium can be adjusted by varying the temperature of the dispersion medium. In one embodiment, the temperature of the dispersion is ambient temperature (i.e., 25° C.). In some embodiments, the dispersion of discontinuous fibres is cooled to a temperature below 0° C., between about −196° C. and about −10° C., between about −80° C. and about −10° C., between about −20° C. and about −10° C., preferably cooled to a temperature at about −10° C. In these embodiments, the frozen dispersion of discontinuous fibres can then be transferred to the container which is heated to a temperature less than 100° C. In some embodiments, the dispersion is heated to a temperature of between about 10° C. and about 100° C., between about 10° C. and about 80° C., preferably between about 20° C. and about 60° C., yet more preferably between about 20° C. and about 40° C.

In preferred embodiments, the force field is an electromagnetic or magnetic field having a magnetic field strength of about $1\times10^{-3}$ to about 20 T, between about $1\times10^{-3}$ and about 10 T, about $1\times10^{-3}$ to about 1 T, preferably between about $1\times10^{-3}$ and about $1\times10^{-1}$ T.

By taking advantage of magnetic forces, higher production rates of aligned discontinuous fibres can be provided.

Without being bound by any one theory, it is believed that the present invention is suitable for longer discontinuous fibres compared to conventional alignment techniques because more space for initial fibre rotation is provided and alignment is less dependent on the magnetic conductivities of the discontinuous fibres and the viscosity of the dispersion medium compared to pure magnetic and hydrodynamic alignment techniques, respectively. In embodiments, longer discontinuous fibres can be aligned by the method of the present invention by providing a homogeneous dispersion of discontinuous fibres in a container prior to passing through the shearing element.

The steps of the method of the present invention can be repeated to dispose a plurality of layers of substantially aligned discontinuous fibres. This can be performed by disposing the at least a portion of the aligned discontinuous fibres over the same area of the substrate. Advantageously, this can provide precise control of the thickness of the resulting composite material comprising the aligned discontinuous fibres made by the method of the invention.

The method of the present invention can also comprise a washing step. The washing step can be performed after a layer of substantially aligned discontinuous fibres is disposed on a substrate to remove residual dispersion medium. The washing step can also be performed after a plurality of layers of substantially aligned discontinuous fibres are disposed on the substrate to remove residual dispersion medium.

In certain embodiments, the washing step comprises washing with an aqueous solution to remove the dispersion medium. In some embodiments, the washing step comprises washing with water to remove the dispersion medium.

Advantageously, washing with an aqueous solution or water can remove glycerine or glycerol when they are used as the dispersion medium.

In some embodiments, the method of the present invention is a batch or continuous method.

Another aspect of the present invention relates to a composite material. Accordingly, the present invention provides a composite material comprising: a binder and substantially aligned discontinuous fibres; wherein the composite material has a fibre volume fraction greater than about 40%. Advantageously, higher fibre volume fractions can be provided as a result of the method of the present invention forming substantially aligned discontinuous fibres compared to randomly oriented discontinuous fibres obtained through conventional carbon fibre recycling techniques.

In yet another aspect, the present invention provides a composite material comprising: a binder and substantially aligned discontinuous fibres; wherein at least about 70% of the discontinuous fibres are aligned within about 10 degrees in one direction.

Advantageously, the composite materials of the present invention have high fibre volume fractions and can be used in applications requiring light weight or sustainable and cost-effective applications as less material (for example carbon fibre) is used.

In certain embodiments, the composite material has a fibre volume fraction greater than about 45%, greater than about 50%, greater than about 55%, greater than about 60% or greater than about 70%. In preferred embodiments, the composite material has a fibre volume fraction between about 40 and about 80%, between about 45 and about 70%, and preferably between about 50 and about 60%.

In certain embodiments, at least about 80% of the discontinuous fibres in the composite material are aligned within about 10° in one direction. In certain embodiments, at least about 90% of the discontinuous fibres in the composite material are aligned within about 10° in one direction. In certain embodiments, at least about 40% of the discontinuous fibres in the composite material are aligned within about 5 degrees in one direction. In certain embodiments, at least about 50% of the discontinuous fibres in the composite material are aligned within about 5 degrees in one direction. In certain embodiments, at least about 53% of the discontinuous fibres in the composite material are aligned within about 5 degrees in one direction. In certain embodiments, at least about 55% of the discontinuous fibres in the composite material are aligned within about 5 degrees in one direction. In certain embodiments, at least about 90% of the discontinuous fibres in the composite material are aligned within about 5 degrees in one direction. In certain embodiments, at least about 70% of the discontinuous fibres in the composite material are aligned within about 3° in one direction. In certain embodiments, at least about 80% of the discontinuous fibres in the composite material are aligned within about 3° in one direction. In certain embodiments, at least about 90% of the discontinuous fibres in the composite material are aligned within about 3° in one direction.

In preferred embodiments, at least about 70% of the discontinuous fibres in the composite material are aligned within about 1.5° in one direction. In preferred embodiments, at least about 80% of the discontinuous fibres in the composite material are aligned within about 1.5° in one direction. In preferred embodiments, at least about 90% of the discontinuous fibres in the composite material are aligned within about 1.5° in one direction.

As discussed herein, the method of the present invention can provide for precise control of the thickness of the disposed layers of the substantially aligned discontinuous fibres depending on the number of times the method is repeated over the same area of substrate. In some embodiments, the composite material has a thickness of between about 10 µm and about 10 mm, between about 100 µm and about 5 mm, preferably between about 100 µm and about 3 mm and most preferably between about 100 µm and about 1 mm. In some embodiments, the composite material has a thickness of between about 1 and about 3 mm.

The present inventor has surprisingly found that the mechanical properties of aligned woven discontinuous fibres (CFRP) in tensile and compression strength were higher than that of randomly oriented discontinuous CFRP.

The binder can be any suitable material and should be compatible with the discontinuous fibres such that the binder does not react or damage the fibre. In some embodiments, the binder is selected from the group consisting of a polymer, ceramic, metal or combinations thereof. In preferred embodiments, the binder is an adhesive film prepreg. In use, the adhesive film prepreg is heated and vacuumed for manufacturing of the composite material.

In some embodiments, the binder is selected from the group consisting of styrene, polyester, vinyl ester, epoxy, phenol, phenol formaldehyde, silicone, cyanate ester, bismaleimide, polyimides, polybutadiene, benzoxazines, polyetheretherketone, polyetherketone, polyamide-imide, polyarylsulfone, polyetherimide, polyethersulfone, polyphenylene sulphide, liquid crystal polymer, polyurethane, aluminium, titanium and magnesium, silicon carbide and combinations thereof.

In one embodiment, the composite material comprises an additive. The addition of additives to the composite material can be used to tailor the physical and chemical properties of the resulting composite materials formed therefrom.

In one embodiment, the additives can be selected from the group consisting of an antioxidant, a thermostabiliser, a plasticiser, a filler, a surfactant, a lubricant, a pigment, a tackifier, a stabiliser, a viscosity modifier, a biocide, a flame retardant and combinations thereof.

The antioxidant can be of any suitable compound to prevent or minimise oxidative degradation reactions of composite material including phenols and phosphites. In one embodiment, the antioxidant is selected from the group consisting of pentaerythritol tetrakis, octadecyl-3-(3,5-di-tert-butyl-4-hydroxyphenyl)-propionate, benzenepropanoic acid, 3,5-bis(1,1-dimrhtyl-ethyl)-4-hydroxy-$C_7$-$C_9$ branched alkyl esters, 3',3',3',5,5',5'-hexa-tert-butyl-a,a',a'-(mesitylene-2,4,6-triyl)tri-p-cresol, tris-(3,5-di-tert-butyl-4-hydroxybenzyl) isocyanurate, 2',3-bis[3-(3,5-di-tert-butyl-4-hydroxyphenyl)propionyl]-propionohydrazide, N,N'-hexane-1,6-diylbis(3-(3,5-di-tert-butyl-4-hydroxyphenyl-propionamide)), 4,6-bis(dodecylthiomethyl)-o-cresol, 4,6-bis(octylthiomethyl)-o-cresol, 2,2'-methylenebis(4-methyl-6-tert-butylphenol), 2,6-di-tert-butyl-4-[[4,6-bis(octylthio)-1,3,5-triazin-2-yl]amino]phenol, tris(2,4-di-tert-butylphenyl)-phosphite, bis(2,4-di-tert-butylphenyl) pentaerythritol diphosphate and combinations thereof.

The thermostabiliser can be of any suitable compound to improve the resistance of the composite material to discoloration. The thermostabiliser can be a lead compound, organotin compound, other metal compound and organic stabiliser. In one embodiment, the thermostabiliser is selected from the group consisting of lead sulphite, lead carbonate, lead stearate, dibutyl tin maleate, barium-cadmium stearate, barium-cadmium-zinc stearate, methyl tin mercaptide, methyl tin ester, butyl tin thioglycolate, n-octyl tin mercaptide, butyl tin mercaptide, butyl tin carboxylate, 3-(2,4-dichlorophenylazo)-9-(2,3-epoxypropane)carbazole, barbituric acid, thiobarbituric acid, poly(hexamethyleneadipate), poly(ethyleneadipate), poly(hexamethylene-terephthalate) and poly(ethyleneterephthalate) and combinations thereof.

Plasticisers can be added to the composite material to improve the processing characteristics of the composite material, while also providing flexibility in the end-use product. Plasticisers can be selected from the group consisting of ester plasticisers, sebacates, adipates, terephthalates, dibenzoates, gluterates, phthalates, azelates and combinations thereof.

The filler can be of any suitable compound to decrease the amount of substantially aligned discontinuous fibres required in the composite material. In one embodiment, the filler is selected from the group consisting of aluminium silicate, potassium silicate, calcium silicate, silica, sodium silicate, clays, kaolin clay, aluminium oxide, limestone, barium sulfate, strontium sulfate/selestite, magnesium oxide, calcium carbonate, dolomite, metal power or flakes, ceramic beads, magnesium silicate and combinations thereof.

The surfactant can be of any suitable compound to provide a surface active film. In one embodiment, the surfactant is anionic, cationic, zwitterionic or non-ionic. In one embodiment, the surfactant comprises a functional group selected from the group consisting of sulfate, sulfonate, phosphate, carboxylate, amine, ammonium, alcohol, ether and combination thereof. In one embodiment, the surfactant is selected from the group consisting of sodium stearate, 4-(5-dodecyl)benzenesulfonate, 3-[(3-cholamidopropyl)dimethylammonio]-1-propanesulfonate, phosphatidylserine, phosphatidylethanolamine, phosphatidylcholine, octaethylene glycol monododecyl ether, pentaethylene glycol monododecyl ether, decyl glucoside, lauryl glucoside, octyl glucoside, triton X-100, nonoxynol-9, glyceryl laurate, polysorbate, dodecyldimethylamine oxide, polysorbate, cocamide monoethanolamine, cocamide diethanolamine, poloxamer, polyethoxylated tallow amine and combinations thereof.

The lubricant can be of any suitable compound to reduce the internal and/or external friction of the aligned discontinuous fibres during processing. In one embodiment, the lubricant is an acid amide, acid ester, fatty acid, hydrocarbon wax, metallic soap or combination thereof. In one embodiment, the lubricant is selected from the group consisting of zinc laurate, zinc stearate, calcium laurate, calcium stearate, lead stearate, magnesium stearate, aluminium stearate, sodium stearate, tin stearate, barium stearate, cobalt stearate, paraffin wax, mineral oil, erucamide, oleamide, stearamide, ethylene bis stearamide, ethylene bis-oleamide, montan wax, stearyl stearate, distearyl pthalate, lauric acid, myristic acid, palmitic acid, stearic acid, oleic acid, erucic acid and combinations thereof.

The pigment can be of any suitable compound to impart colour to the resulting composite material. In one embodiment, the pigment is an inorganic pigment or an organic pigment. In one embodiment, the pigments are derived from compounds selected from the group consisting of an acridine, anthraquinone, diarylmethane, triarylmethane, azo, diazonium, nitro, nitroso, phthalocyanine, quinone, thiazine, oxazone, oxazin, indophenol, thiazole, safranin, xanthene, fluorene, fluorone and combinations thereof. In one embodiment, the pigment is selected from the group consisting of cadmium yellow, cadmium red, cadmium green, cadmium orange, cadmium sulfoselenide, chrome yellow, chrome green, cobalt violet, cobalt blue, cerulean blue, aureolin, azurite, han purple, han blue, egyptian blue, malachite, paris green, phthalocyanine blue BN, phthalocyanine green G, verdigris, viridian, sanguine, caput mortuum, oxide red, red ochre, venetian red, prussian blue, lead white, cremnitz white, naples yellow, red lead, manganese violet, vermilion, titanium yellow, titanium beige, titanium white, titanium black, zinc white, zinc ferrite, carbon black, ivory black, yellow ochre, raw sienna, burnt sienna, raw umber, burnt umber, ultramarine, ultramarine green shade, alizarin, alizarin crimson, gamboge, cochineal red, rose madder, indigo, indian yellow, tyrian purple, quinacridone, magenta, phthalo green, phthalo blue, pigment red 170, diarylide yellow and combinations thereof.

The tackifier can be of any suitable compound to impart adhesiveness to the resulting composite material. In one embodiment, the tackifier is selected from the group consisting of a rosin resin, hydrocarbon resin, terpene resin and combinations thereof. In one embodiment, the rosin resin is selected from the group consisting of rosin ester, hydrogenated rosin resin, dimerised rosin resin and combinations thereof. In one embodiment, the rosin resin is derived from wood rosin, gum rosin, tall oil rosin or combination thereof.

In one embodiment, the hydrocarbon resin is a $C_5$ alkyl resin, $C_5$ alkenyl resin, $C_9$ aryl resin or combination thereof.

In one embodiment, the terpene resin is a terpene phenol resin, alkyl terpene resin, alkenyl terpene resin, aryl terpene resin or combination thereof.

The stabiliser can be of any suitable compound which can directly or indirectly reduce the impact of UV radiation. In one embodiment, the stabiliser is a UV absorber, hindered amine light stabiliser and combination thereof. In one embodiment, the UV absorber is a hindered phenol. In one embodiment, the stabiliser is selected from the group consisting of 4-allyloxy-2-hydroxybenzophenone, 1-aza-3,7-dioxabicyclo[3.3.0]octane-5-methanol, tris(nonylphenyl) phosphite, 1,3,5-tris(2-hydroxyethyl)isocyanurate, tris(2,4-di-tert-butylphenyl) phosphite, tris(4-tert-butyl-3-hydroxy-2,6-dimethylbenzyl) isocyanurate, 1,3,5-trimethyl-2,4,6-tris (3,5-di-tert-butyl-4-hydroxybenzyl)-benzene, triisodecyl phosphite, tetrachloro-1,4-benzoquinone, sodium D-isoascorbate monohydrate, poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetra-methyl-4-piperidyl)imino], 2-phenyl-5-benzimidazolesulfonic acid, pentaerythritol tetrakis(3,5-di-tert-butyl-4-hydroxyhydrocinnamate), octadecyl 3-(3,5-di-tert-butyl-4-hydroxyphenyl)propionate, 4-nitrophenol sodium salt, methylhydroquinone, 5,5'-methylenebis(2-hydroxy-4-methoxybenzophenone), 2,2'-methylenebis(6-tert-butyl-4-methylphenol), 2,2'-methylenebis(6-tert-butyl-4-ethylphenol), 2,2'-methylenebis[6-(2H-benzotriazol-2-yl)-4-(1,1,3,3-tetramethylbutyl)phenol], methyl-p-benzoquinone, 2-methoxyhydroquinone, menthyl anthranilate, 2-hydroxy-4-(octyloxy)benzophenone, 2,2'-ethylidene-bis(4,6-di-tert-butylphenol), 2-ethylhexyl salicylate, 2-ethylhexyl trans-4-methoxycinnamate, 2-ethylhexyl 2-cyano-3,3-diphenylacrylate, ethyl 2-cyano-3,3-diphenylacrylate, 5-ethyl-1-aza-3,7-dioxabicyclo[3.3.0]octane, ditridecyl 3,3'-thiodipropionate, 2-(4,6-diphenyl-1,3,5-triazin-2-yl)-5-[(hexyl)oxy]-phenol, 4,4-dimethyloxazolidine, 2,3-dimethylhydroquinone, 2',4'-dihydroxy-3'-propylacetophenone, 2,2'-dihydroxy-4-methoxybenzophenone, 2,2'-dihydroxy-4,4'-dimethoxybenzophenone, 2,4-dihydroxybenzophenone, didodecyl 3,3'-thiodipropionate, 3',5'-dichloro-2'-hydroxyacetophenone, 2,6-di-tert-butyl-4-(dimethylaminomethyl)phenol, 2,4-di-tert-butyl-6-(5-chloro-2H-benzotriazol-2-yl)phenol, 5-chloro-2-hydroxy-4-methylbenzophenone, 5-chloro-2-hydroxybenzophenone, 2-tert-butyl-4-ethylphenol, 2-tert-butyl-6-(5-chloro-2H-benzotriazol-2-yl)-4-methylphenol, bis(2,2,6,6-tetramethyl-4-piperidyl) sebacate, bis(1-octyloxy-2,2,6,6-tetramethyl-4-piperidyl) sebacate, 3,9-bis(octadecyloxy)-2,4,8,10-tetraoxa-3,9-diphosphaspiro[5.5]undecane, bis(octadecyl)-hydroxylamine, 3,9-bis(2,4-dicumylphenoxy)-2,4,8,10-tetraoxa-3,9-diphosphaspiro[5.5]undecane, 2-(4-benzoyl-3-hydroxyphenoxy)ethyl acrylate, 2-(2H-benzotriazol-2-yl)-4-(1,1,3,3-tetramethylbutyl)phenol, 2-(2H-Benzotriazol-2-yl)-4-methyl-6-(2-propenyl)phenol, 2-[3-(2H-benzotriazol-2-yl)-4-hydroxyphenyl]-ethyl methacrylate, 2-(2H-benzotriazol-2-yl)-6-dodecyl-4-methylphenol, 2-(2H-benzotriazol-2-yl)-4,6-di-tert-pentylphenol, 2-(2H-benzotriazol-2-yl)-4,6-bis(1-methyl-1-phenylethyl)phenol and combination thereof.

The viscosity modifier can be of any compound suitable to modify the viscosity index of the resulting composite material. In one embodiment, the viscosity modifier is selected from the group consisting of tris(dipropyleneglycol)phosphite, polytetrafluoroethylene, diethyltoluenediamine, dimethoxyethane, 4-hydroxybutyl acrylate, sodium lauryl sulfate, aluminum stearate, lead stearate, stearic acid, 2-ethylhexyl 3-mercaptopropionate, 2-ethylhexyl mercaptoacetate, butyl 3-mercaptopropionate, iso-octyl 3-mercaptopropionate, isooctyl mercaptoacetate, calcium carbonate, 1,1'-carbonyl biscaprolactum, 2-ethyl-1,3-hexanediol, methyl ethyl ketoxime, magnesium hydroxide, silicon dioxide, magnesium oxide, 1,3:2,4-bis-O-benzylidene-D-glucitol (dibenzylidene sorbitol), ammonium acetate, zinc stearate, 2,5-dimethyl-2,5-di-(tert-butylperoxy)-hexane, triphenyl phosphite, xanthan gum, ethylene glycol monostearate, bis-(dimethylamino)dimethylsilane and combinations thereof.

The biocide can be any suitable compound for controlling organisms. In one embodiment, the biocide is a pesticide, an antimicrobial and combinations thereof. In one embodiment, the pesticide is selected from the group consisting of a fungicide, herbicide, insecticide, algaecide, molluscicide, miticide and rodenticide and combinations thereof. In one embodiment, the antimicrobial is selected from the group consisting of a germicide, antibiotic, antibacterial, antiviral, antifungal, antiprotozoal, antiparasite and combinations thereof. In one embodiment, the biocide is selected from the group consisting of a metal or salt thereof, aldehyde, acid, halogen, amine and halogenated amide, heterocyclic ketone and combinations thereof. In one embodiment, the biocide is selected from the group consisting of silver or salt thereof, glutaraldehyde, thiocarbamate, triclosan, sodium hydroxide, vitamin K, phenol, 2-thiocyanomethylthio benzothiazole, benzalkonium chloride, chlorothalonil, dichlofluanid, 1-(3-chloroallyl)-3,5,7-triaza-1-azoniaadamantane chloride, 2-methylthio-4-tertbutylamino-6-cyclo-propylamino-s-triazine, bromine, chlorine, chlorine dioxide, iodine, sodium chlorite, hydrogen peroxide, potassium permanganate, peracetic acid, polyhexamethylene biguanide, isothiazolone, fatty amine, dibromonitrilopropionamide and combinations thereof.

The flame retardant can be minerals, organohalogen compounds, organophosphorus compounds, organic compounds and combinations thereof. In certain embodiments, the flame retardant is selected from the group consisting of alumina trihydrate, aluminium hydroxide, magnesium hydroxide, huntite, hydromagnesite, red phosphorus, decabromodiphenyl ether, decabromodiphenyl ethane, brominated polystyrenes, brominated carbonate oligomers, brominated epoxy oligomers, tetrabromophthalic anyhydride, tetrabromobisphenol A, hexabromocyclododecane, antimony trioxide, sodium antimonate, triphenyl phosphate, resorcinol bis(diphenylphosphate), bisphenol A diphenyl phosphate, tricresyl phosphate, dimethyl methylphosphonate, aluminium diethyl phosphinate, tris(2,3-dibromopropyl)phosphate, tris(1,3-dichloro-2-propyl)phosphate, tetrakis(2-chlorethyl)dichloroisopentyldiphosphate, carboxylic acid, dicarboxylic acid and combinations thereof.

It should be understood that the additives as discussed above can be added to the composite material in any suitable amount to provide the desired properties. In one embodiment, the additive is added to the composite material in an amount of from about 1 to about 50 wt %, in an amount of from about 10 to about 40 wt %, in an amount of from about 10 to about 30 wt % or in an amount of from about 20 to about 30 wt %.

In some embodiments, the composite material of the present invention can be laminated or coated. In certain embodiments, the composite material can be laminated or coated with the additives described herein.

Example 1—A Method of Aligning Discontinuous Fibres

As shown in FIG. 1 there is provided a hybrid hydromagnetic fibre alignment apparatus 100, the fibre aligning apparatus 102 is connected in fluid communication via a dispersion supply tube 103 to a container 104 for storing the dispersion of discontinuous fibres which is typically recycled carbon fibre. To maintain the discontinuous fibres as a dispersion, the container 104 can comprise an agitator 106 in the form of an impeller or high-speed stirrer. To provide a homogeneous dispersion of discontinuous fibres, the dispersion can first be frozen at −10° C. and then added to the container 104 which is heated to up to 100° C. The container 104 has a heating element (not shown) to heat the dispersion and control the viscosity for the dispersion such that the dispersion can flow through the fibre aligning apparatus 102.

The fibre aligning apparatus 102 is gravity fed causing flow of the dispersion through the fibre aligning apparatus 102.

Alternatively, a pump could be connected to the container 104 to provide a positive pressure greater than 1 atm to the dispersion of discontinuous fibres in a dispersion medium causing flow of the dispersion through the fibre aligning apparatus 102. The flow rate of the dispersion through the fibre aligning apparatus 102 can be controlled by the pressure applied by the pump 108.

The fibre aligning apparatus 102 comprises a shearing element 108 having an inlet 110 for receiving a stream of discontinuous fibres in a dispersion medium from the dispersion supply tube 103. The shearing element 108 is a convergent nozzle having a contoured surface (convex) in the direction of flow of the stream of discontinuous fibres to minimise obstruction of the fibre alignment. The convergent nozzle of the shearing element 108 has an outlet 112 in the form of a slit having a defined width. Discontinuous fibres are aligned inside the convergence nozzle through a velocity gradient across the dispersion stream.

The stream of discontinuous fibres is also directed through a force field element 114 in the form of a solenoid. The solenoid is configured to have multi parallel wing-shaped walls (not shown) containing wire-wrapped pipes (not shown) to produce an electromagnetic field. The magnetic field component is formed within the pipes which further aligns the discontinuous fibres.

As shown in FIG. 1, a permeable substrate 116 receives a deposit of aligned discontinuous fibres.

For convenience, the numbering of the remaining Figures showing alternative configurations have been maintained as per FIG. 1.

Figure 2A:
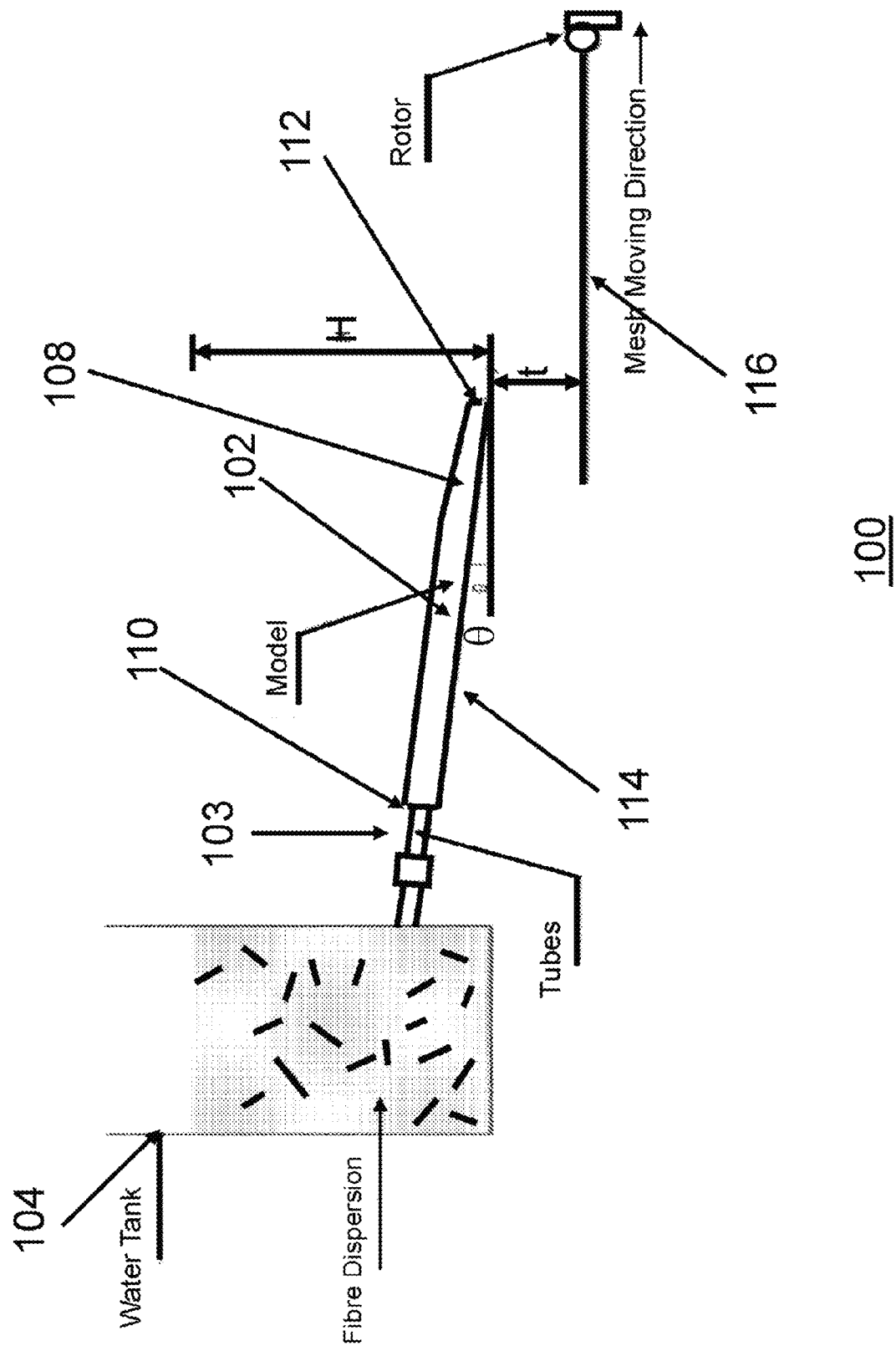
FIG. 2 shows (a) an alternative schematic of a hybrid hydromagnetic fibre alignment apparatus of Example 1; (b) a representation of the fibre aligning apparatus having a plurality of shearing elements; and (c) a representation of the flow of the dispersion medium through the plurality of shearing elements.
Figure 2B:
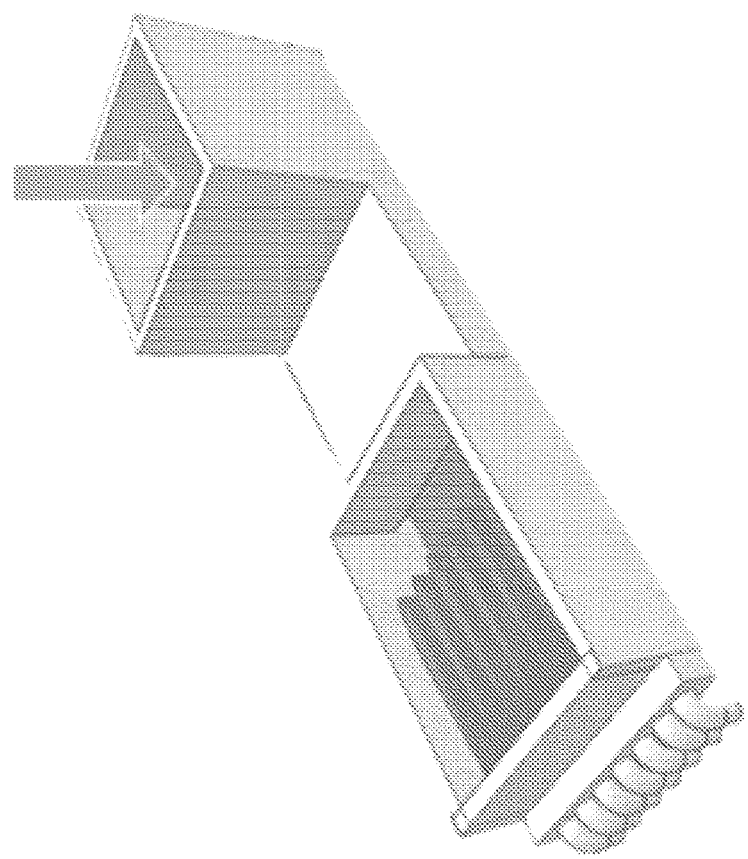
Figure 2C:
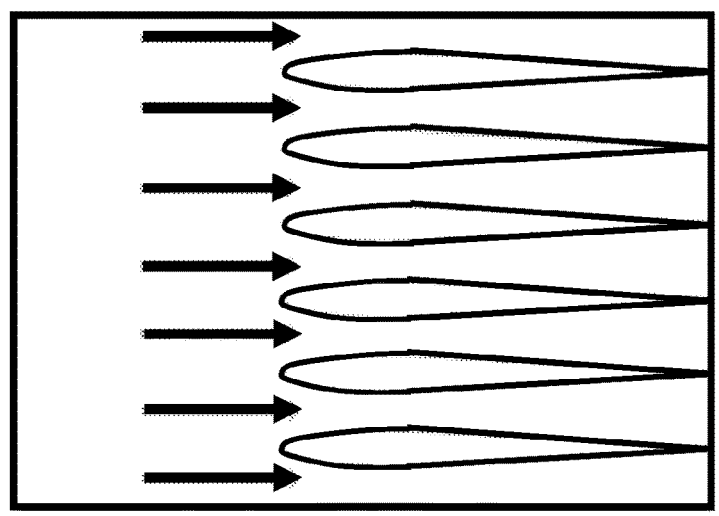
Figure 3A:
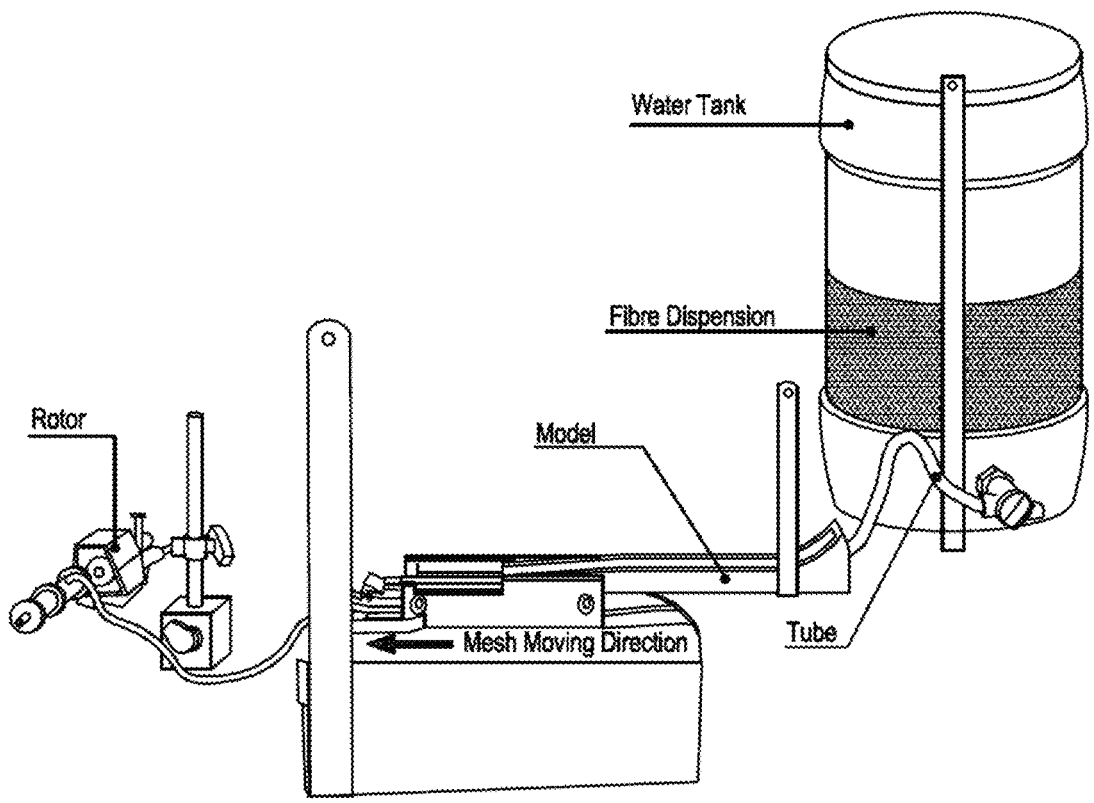
FIG. 3(a) is the actual set up; 3(b) is an alternative view showing fibre dispersion, alignment and collection; and 3(c) shows the deposition angle and shooting velocity at outlet.
Figure 3B:
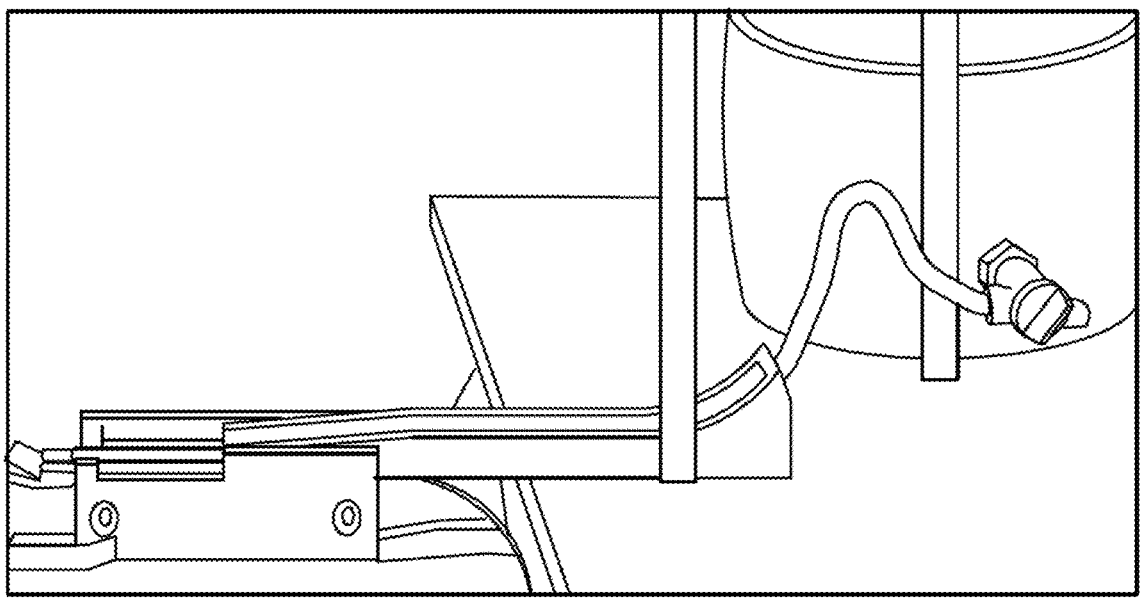
FIG. 3 shows photographic representation of a hybrid hydromagnetic fibre alignment apparatus of Example 1.
Figure 3C:
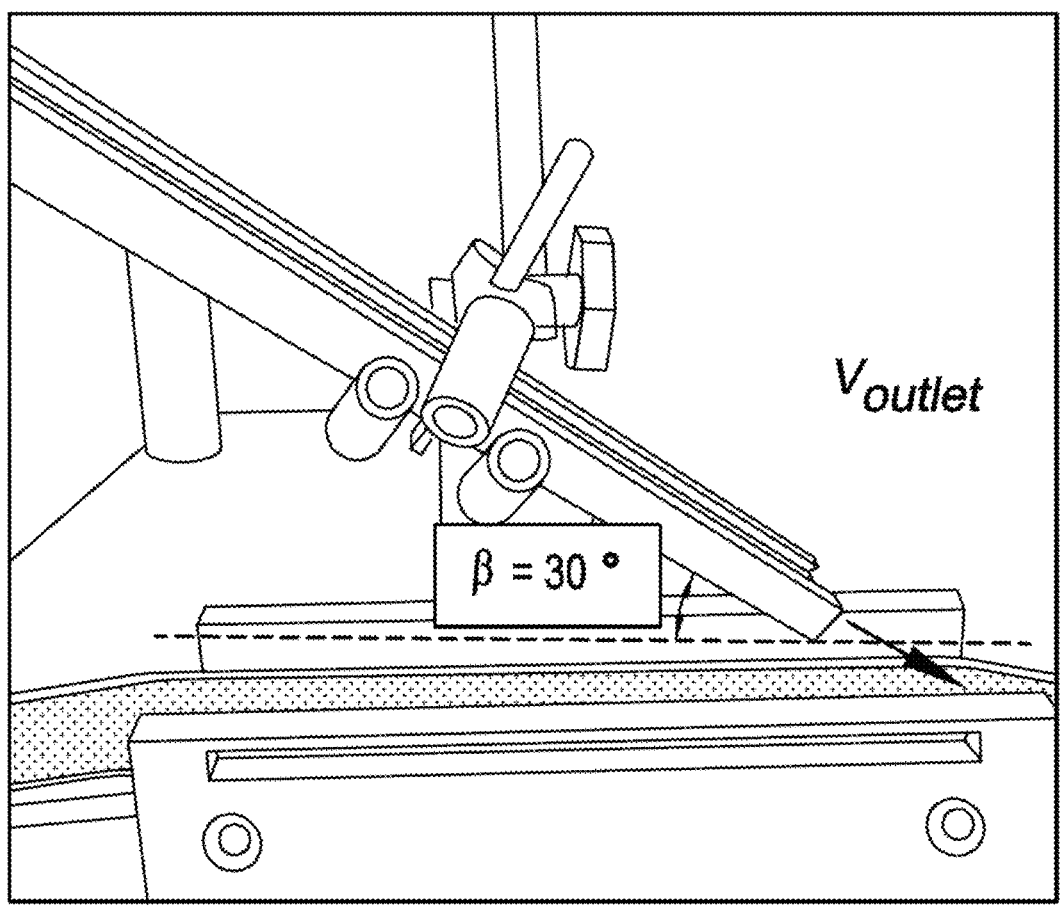

FIG. 2, shows alternative schematic of a hybrid hydromagnetic fibre alignment apparatus 100. FIG. 3 shows a photographic representation of a hybrid hydromagnetic fibre alignment apparatus 100.

FIG. 4 shows a further alternative fibre alignment apparatus (without a force field element).

Figure 5A:
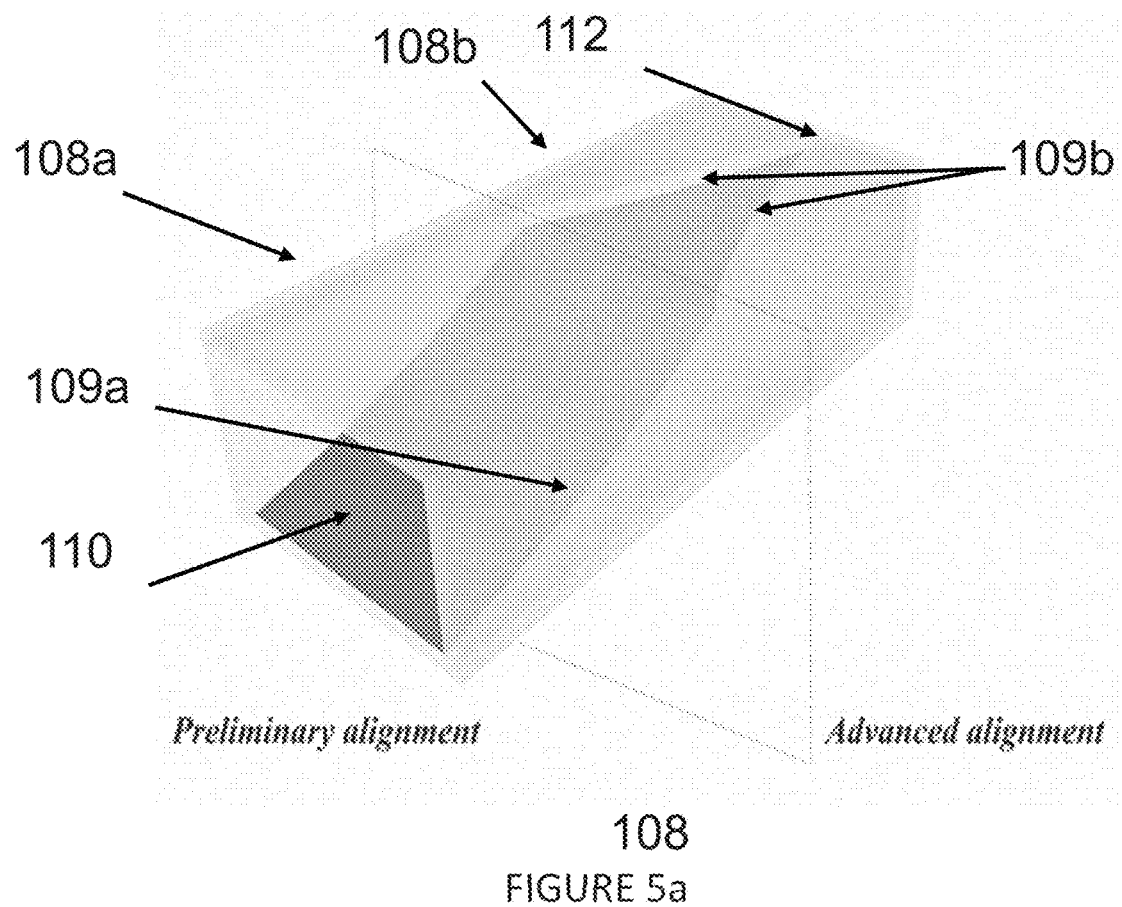
FIG. 5a shows an embodiment of the shearing element (realignment channel) having a housing.
Figure 5B:
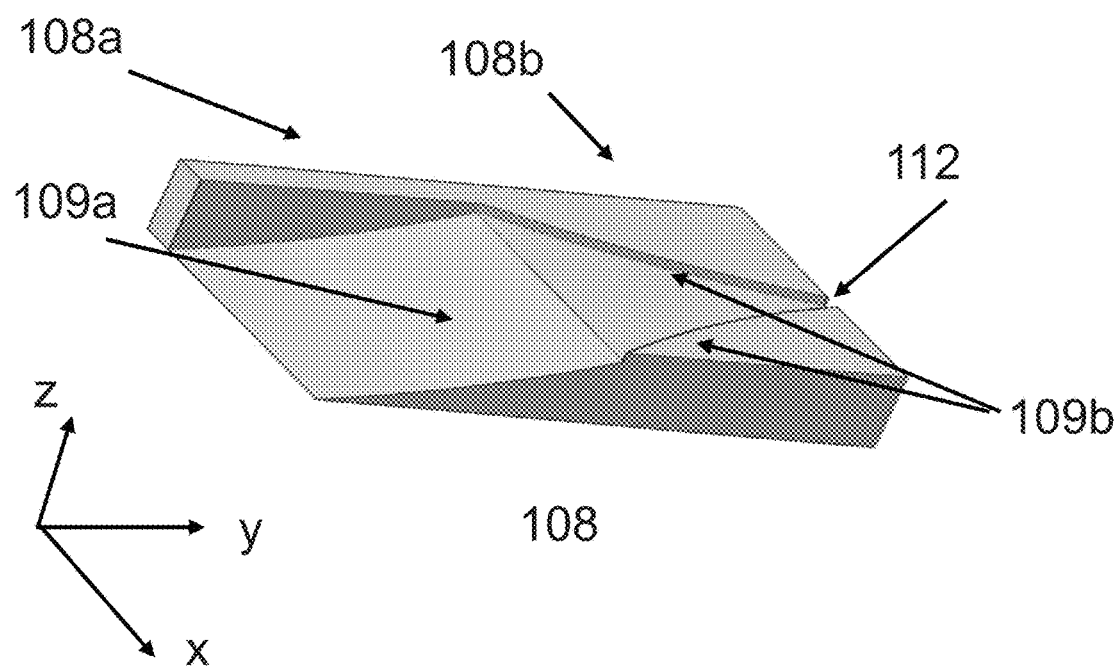
FIG. 5b shows an alternative view of FIG. 5a without the housing.

FIG. 5 shows exemplary embodiments of the components of the fibre aligning apparatus of FIG. 4. FIG. 5a shows an embodiment of the shearing element (realignment channel) having a first region 108a having a concave ramp surface 109a on a first plane and a second region 108b having two convex convergent surfaces 109b with the outlet 112. FIG. 5b shows an alternative view of FIG. 5a without the housing.

Figure 6A:
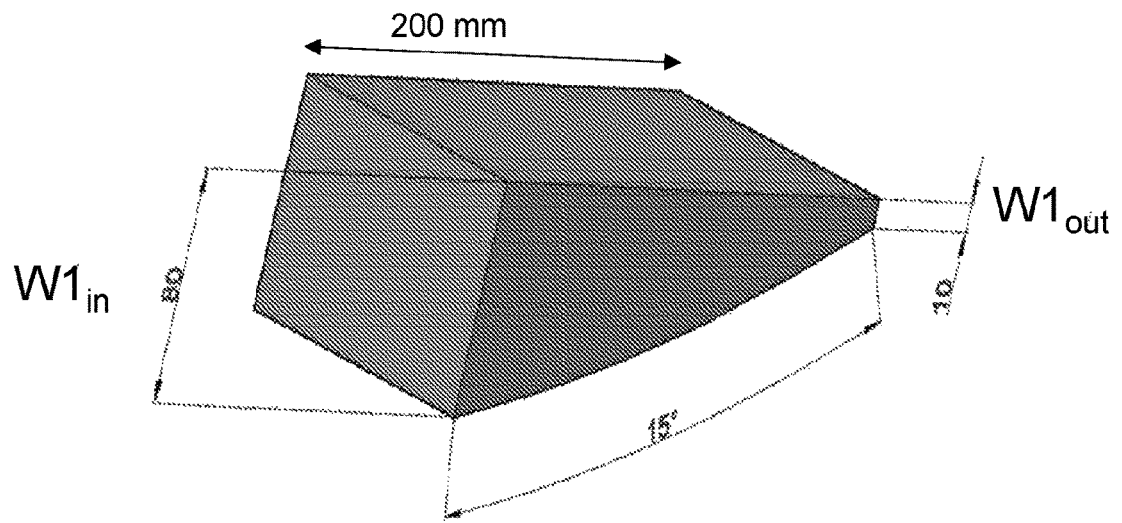
FIG. 6a shows the first region of the shearing element and FIG. 6b shows the second region of the shearing element of corresponding FIG. 5. The shaded area represents the void space of corresponding FIG. 5. The scale is in measurements of mm.
Figure 6B:
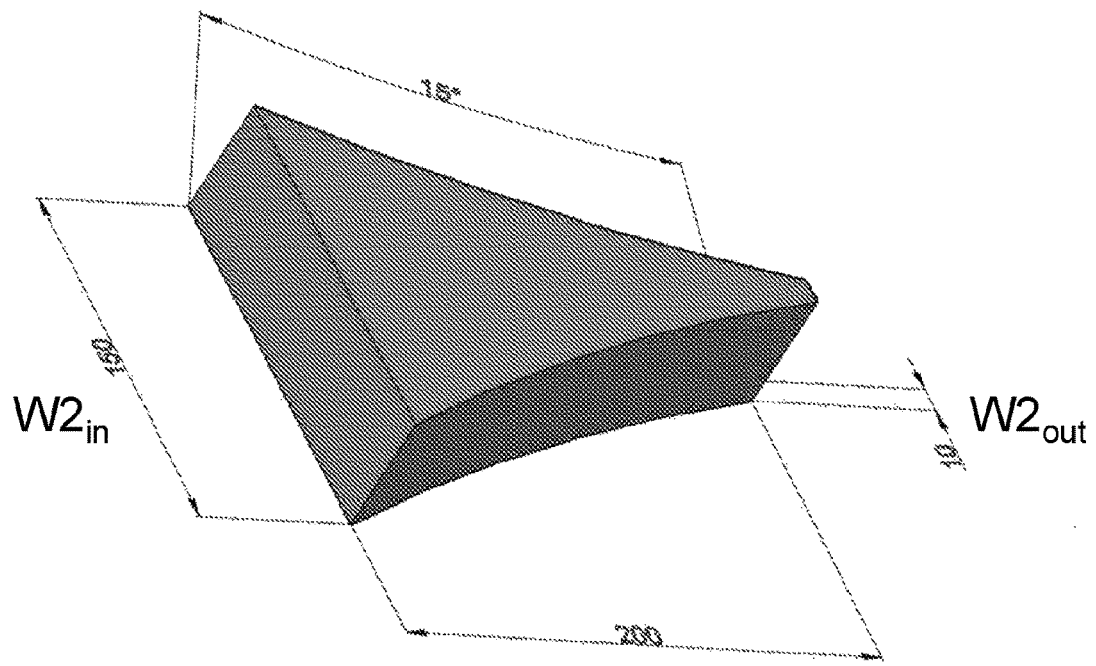

FIG. 6a shows the first region 108a of the shearing element 108 and FIG. 6b shows the second region 108b of the shearing element 108 of corresponding FIG. 5a. The shaded area is the void space to receive the stream of discontinuous fibres. The scale is in measurements of mm.

Figure 7:
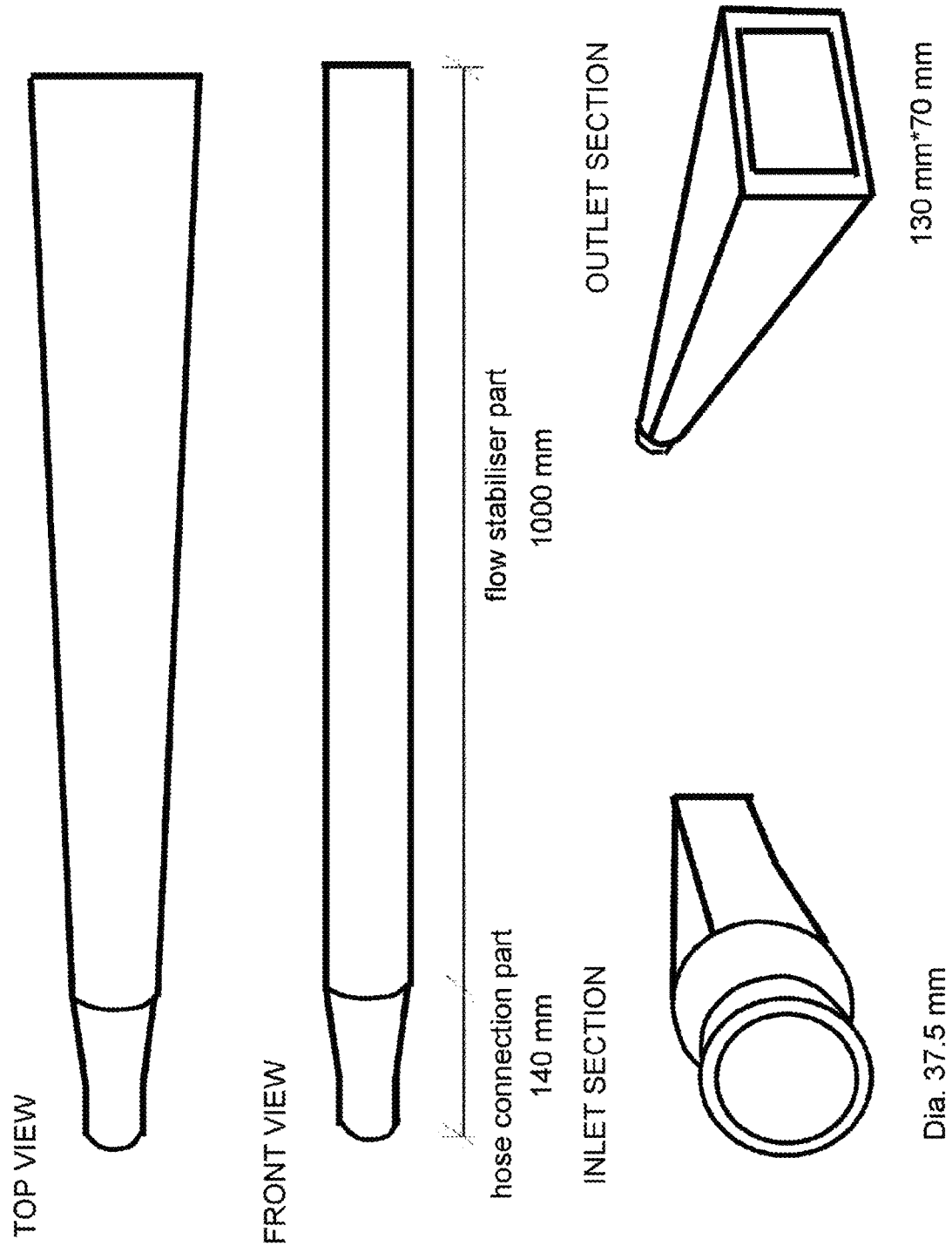
FIG. 7 shows an exemplary embodiment of a flow stabiliser section/channel of the present invention in fluid communication with a container and the shearing element of the present invention.

FIG. 7 shows a flow stabiliser section/channel which is between the container 104 (not shown) and the shearing element 108. In preferred embodiments, realignment can be provided by providing a stable flow for the dispersion of discontinuous fibres using a flow stabiliser section/channel as shown in FIG. 7 in combination with the shearing element as shown in FIG. 5 where the first region can provide preliminary alignment, followed by the second region which can provide advanced alignment. The first region of the shearing element can provide yz plane control (preliminary alignment) and the second region can provide xy plane control (advanced alignment) as shown in FIG. 5. Advantageously, separate fibre alignment control in each plane can avoid rapid multi-direction gradient changes which could lead to fibre blockage and lower fibre movement efficiency.

Figure 8:
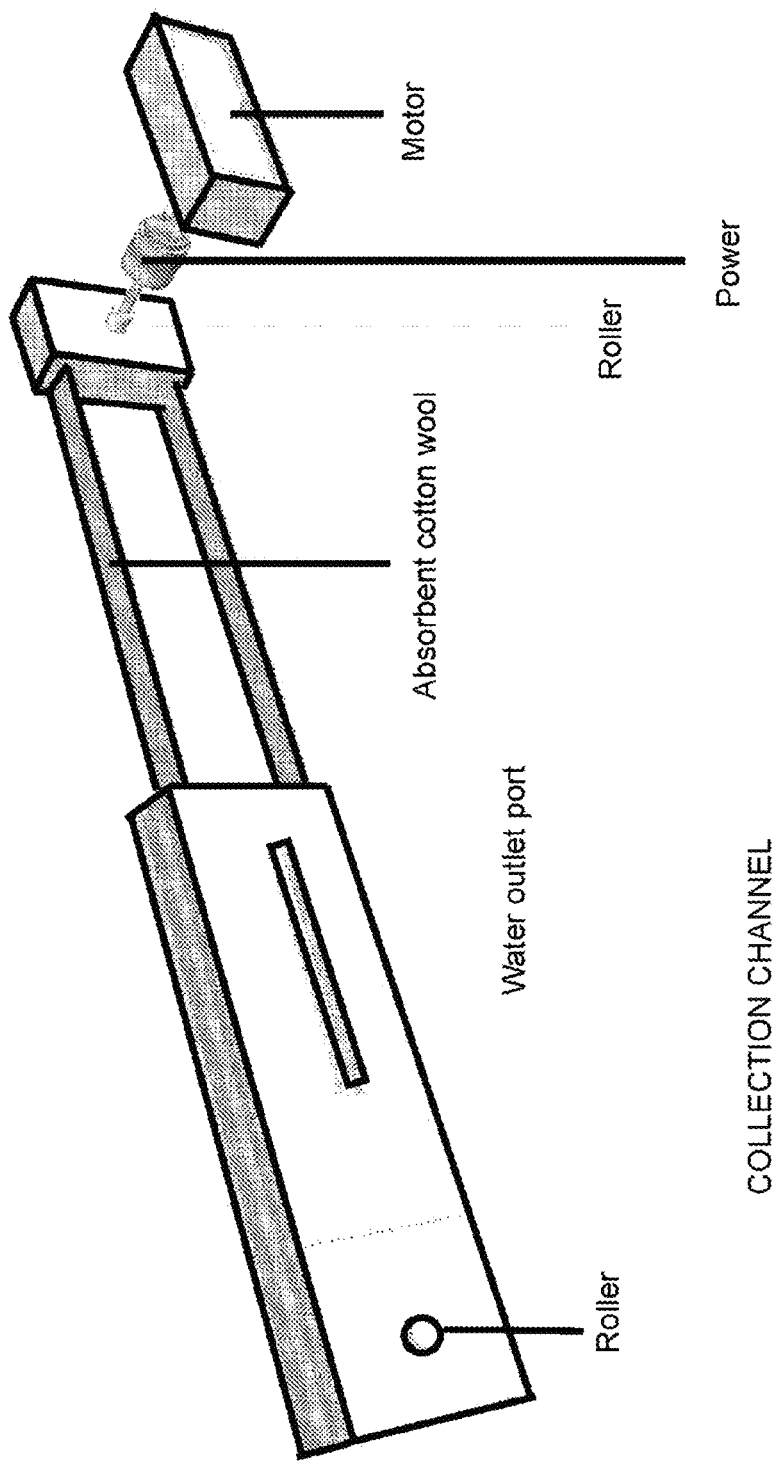
FIG. 8 shows an alternative embodiment of a system to receive a deposit of aligned discontinuous fibres.

FIG. 8 shows an alternative embodiment of a system to receive a deposit of aligned discontinuous fibres. The embodiment as shown in FIG. 8 can provide an efficient method for collection of highly aligned fibres. The collection channel was designed in a way to minimise fibre misalignment caused by fluid spilt from outlet of realignment channel and shearing element and absorbent cotton wool was used for rapid fibre drying.

After the alignment method of the invention according to Example 1 using the embodiment of FIG. 1, around 90% of 5 mm carbon fibres will be aligned within the range of 1.5 degrees in the longitudinal direction, which is more precise than the conventional hydrodynamic alignment method. In general, with increasing fibre length, the degree of alignment of fibres in target direction will decrease. However, for 20 mm carbon fibre, the method of the invention according to Example 1 can reach higher alignment quality (80% within 1.5 degree) compared to the hydrodynamic method (70% within 1.5 degree). The added magnetic field can minimise misalignment during extrusion of fibres from the tank.

Figure 9A:
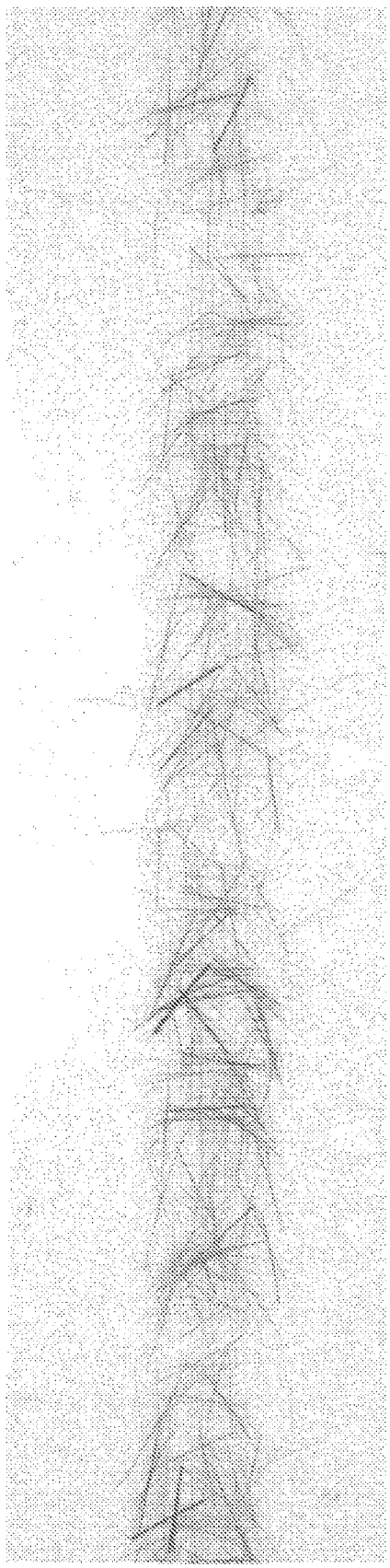
FIG. 9(a) shows aligned fibres obtained under 5 mm/0.004% conditions.
Figure 9B:
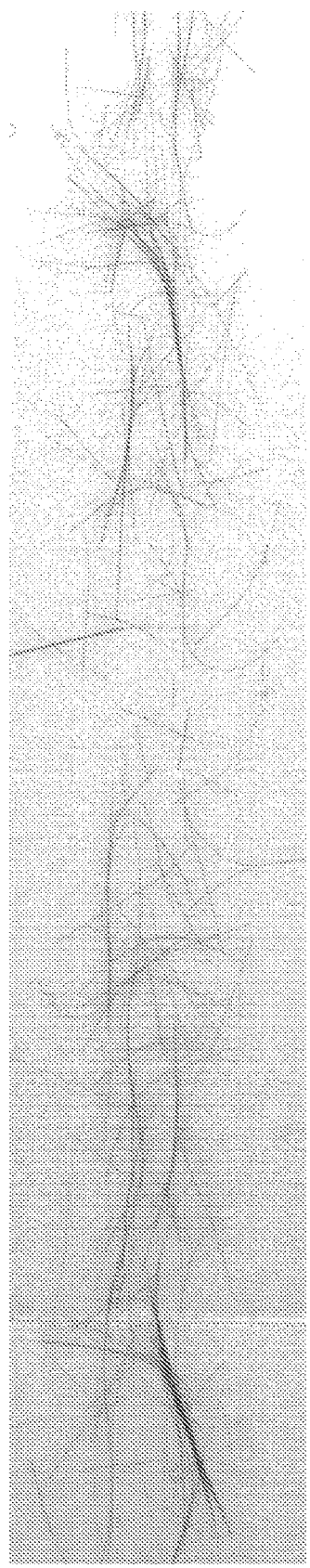
FIG. 9(b) shows aligned fibres obtained applying 8 mm/0.002% process parameters.

FIG. 9 shows representative discontinuous fibres aligned by the inventive method.

Magnetic forces have more significant effect on longer fibres than short ones. In terms of mechanical behaviour, the aligned recycled carbon fibre composite materials have approximately four times higher tensile strength than the randomly oriented discontinuous fibres.

Without wishing to be bound by any one theory, the present Applicant believes that CFRP composite formed using the present invention have a potential synergistic effect of using a shearing element and force field element on alignment quality and fibre length on the final mechanical properties of CFRP materials.

The degree of alignment of discontinuous fibres are characterised using electron microscopy such as transmission electron microscopy and scanning electron microscopy.

Example 2—Preparation of Dispersion of Discontinuous Fibres

In certain embodiments of the present invention, it is desirable to have at least one of the following advantages:

achieve sufficient and stable fibre dispersion by reducing flocculation;

ensure constant or consistent fibre concentration in the solution (i.e., homogeneous);

avoiding blockages to increase productivity;

reduce fibre damage due to intertwining; and achieve high degree of fibre realignment.

The experiments were divided into two phases: Stage 1—preparation of the dispersion of discontinuous fibres; and Stage 2—alignment of discontinuous fibres. During stage 1, optimum dispersion methods (i.e. magnetic, ultrasonic, and physical) and effective parameters (i.e. fibre length, fibre concentration, solution temperature, fibre pre-treatment, and stirring time) were determined.

Experimental Set-Up

Table 1 shows an exemplary experimental set-up of stage 1.

TABLE 1

| Stage 1 Experimental set-up | |
|---|---|
| Fibre length | 5 mm, 10 mm and 15 mm (Carbon fibre) |
| Solution | Water |
| Dispersion method | Physical stirring (electrical stirrer with spiral mixing rod) Magnetic stirring (magnetic stirrer with Low/High Temperature Resistance Laboratory Magnetic Stir Bar - rotation speed: 800 rpm) Ultrasonic stirring (sonicator, output max power: 650 w, 15 mm horn diameter, power: 30%, U-time on: 2 s, U-time off: 2 s) |
| Test room condition | Temperature: 24° C.-28° C. during the day |

Experimental Plan

The number of parameters and test matrix were designed based on Taguchi method. For each combination, three samples (three replicates) were tested for reproducibility. Table 2 shows the experimental matrix for stage 1.

Several images (not shown) were taken during the test to analyse dispersion level for each above configuration. Each image was analysed after test using an image processing algorithm and dispersion degree was determined.

The following assumptions were made to determine dispersion degree from each image.

Measurement of the dispersion degree 1. spatial arrangement is the main factor used for measuring the dispersion degree, which is determined by $All_{SD}$ (standard deviation of the fibre percentages of all the square windows) values—lower SD means better distribution;
2. Reduction factor for fibre sticky and interaction effect is based on fibre bundle percentage;
3. Unbundled fibre SD=(1—fibre bundle percentage)*fibre SD
4. if unbundled SD/all SD>75%, no reduction factor applied, if unbundled SD/all SD<=75%, each 15% increase cause 0.05 index reduction on 'all SD value'. Note: 75% is applied as demarcation point based on the interpretation guide of the impact of statistical heterogeneity—75% to 100%: considerable heterogeneity.
5. Fibre detection correction coefficient $$Coeff = \frac{\Sigma(fibre_i - fibre_{mean}) * (ideal_i - ideal_{mean})}{\Sigma(fibre_i - fibre_{mean})^2 * (ideal_i - ideal_{mean})^2}$$

Fibre dispersion degree = $all_{SD} \times \sqrt{Coef_{row}^2 + Coef_{col}^2} \div weightfraction_{fibre}$

TABLE 2

| Test No. | Temperature of solution | Fibre concentration (w/w) | Fibre length | Fibre pre-treatment | Stirring time | Stirring methodology |
|---|---|---|---|---|---|---|
| G1: 1.2.3 | 30 | 0.001% | 5 mm | No | 30 s | magnetic |
| G2: 1.2.3 | 30 | 0.001% | 5 mm | No | 60 s | physical |
| G3: 1.2.3 | 30 | 0.001% | 5 mm | No | 120 s | ultrasonic |
| G4: 1.2.3 | 30 | 0.002% | 10 mm | Freeze&Unfreeze | 30 s | magnetic |
| G5: 1.2.3 | 30 | 0.002% | 10 mm | Freeze&Unfreeze | 60 s | physical |
| G6: 1.2.3 | 30 | 0.002% | 10 mm | Freeze&Unfreeze | 120 s | ultrasonic |
| G7: 1.2.3 | 30 | 0.003% | 15 mm | Freeze&Heat | 30 s | magnetic |
| G8: 1.2.3 | 30 | 0.003% | 15 mm | Freeze&Heat | 60 s | physical |
| G9: 1.2.3 | 30 | 0.003% | 15 mm | Freeze&Heat | 120 s | ultrasonic |
| G10: 1.2.3 | 45 | 0.001% | 10 mm | Freeze&Heat | 30 s | physical |
| G11: 1.2.3 | 45 | 0.001% | 10 mm | Freeze&Heat | 60 s | ultrasonic |
| G12: 1.2.3 | 45 | 0.001% | 10 mm | Freeze&Heat | 120 s | magnetic |
| G13: 1.2.3 | 45 | 0.002% | 15 mm | No | 30 s | physical |
| G14: 1.2.3 | 45 | 0.002% | 15 mm | No | 60 s | ultrasonic |
| G15: 1.2.3 | 45 | 0.002% | 15 mm | No | 120 s | magnetic |
| G16: 1.2.3 | 45 | 0.003% | 5 mm | Freeze&Unfreeze | 30 s | physical |
| G17: 1.2.3 | 45 | 0.003% | 5 mm | Freeze&Unfreeze | 60 s | ultrasonic |
| G18: 1.2.3 | 45 | 0.003% | 5 mm | Freeze&Unfreeze | 120 s | magnetic |
| G19: 1.2.3 | 60 | 0.001% | 15 mm | Freeze&Unfreeze | 30 s | ultrasonic |
| G20: 1.2.3 | 60 | 0.001% | 15 mm | Freeze&Unfreeze | 60 s | magnetic |
| G21: 1.2.3 | 60 | 0.001% | 15 mm | Freeze&Unfreeze | 120 s | physical |
| G22: 1.2.3 | 60 | 0.002% | 5 mm | Freeze&Heat | 30 s | ultrasonic |
| G23: 1.2.3 | 60 | 0.002% | 5 mm | Freeze&Heat | 60 s | magnetic |
| G24: 1.2.3 | 60 | 0.002% | 5 mm | Freeze&Heat | 120 s | physical |
| G25: 1.2.3 | 60 | 0.003% | 10 mm | No | 30 s | ultrasonic |
| G26: 1.2.3 | 60 | 0.003% | 10 mm | No | 60 s | magnetic |
| G27: 1.2.3 | 60 | 0.003% | 10 mm | No | 120 s | physical |

-continued

Fibre dispersion degree =

$$\left\{ all_{SD} \left( (1-0.05) \left\{ \frac{\left[\frac{(1-fibre\ bundle\ percentage)*fibre_{SD}}{all_{SD}} - 75\%\right]}{15} \right] \right\} \right\} \times$$

$$\sqrt{Coef_{row}^2 + Coef_{col}^2} \div weight\ fraction_{fibre}$$

Details describing the measurement of the dispersion degree is further discussed in Example 5.

Image Processing

An example of the image processing for dispersion image analysis using the equation above is shown in Table 2.

An optimised dispersion set up for an embodiment of the invention is as follows:
Fibre concentration: 0.001% w/v.
Stirring method: Sonicator
Fibre length: 5 mm
Stirring time: 30 s
Temperature of solution: 30° C.
Pre-treatment: freeze and unfreeze. This configuration was used for analysis of fibre alignment degree in Example 3.

Example 3—Fibre Realignment Stage

The degree of fibre alignment using the alternative fibre alignment apparatus (without a force field element) as described in Example 1 with reference to FIG. 4 and FIG. 5.

TABLE 2

| | | Features extracted from the processed image | | | | | | | |
|---|---|---|---|---|---|---|---|---|---|
| No. | Image name | All mean | All sd | Row SSE | Row MSE | Row MAE | Row Coeff | Col SSE | Col MSE |
| G11 | IMG_0068.CR2 | 0.1505 | 0.1699 | 0.000167 | 0.001037 | 0.00085 | 0.8625 | 0.000371 | 0.001548 |
| G12 | IMG_0081.CR2 | 0.1181 | 0.1598 | 0.000339 | 0.00148 | 0.001203 | 0.7602 | 0.000343 | 0.001488 |
| G13 | IMG_0003_1.CR2 | 0.1764 | 0.1808 | 0.000187 | 0.001098 | 0.00092 | 0.8598 | 0.000148 | 0.000976 |

| No. | Col MAE | Col Coeff | Total_fibre (pixel) | Total_weighted_fibre (pixel) | Total_thick (pixel) | Total_weighted_thick (pixel) | Total percentage | Weighted_percentage |
|---|---|---|---|---|---|---|---|---|
| G11 | 942392 | 952637 | 5884 | 16128.9 | 0.0062 | 0.0169 | 942392 | 952637 |
| G12 | 740195 | 749521 | 4617 | 13942.8 | 0.0062 | 0.0186 | 740195 | 749521 |
| G13 | 1104643 | 1157739 | 35553 | 88648.9 | 0.0322 | 0.0766 | 1104643 | 1157739 |

| No. | unbundled fibre SD | unbundled sd/all sd | Reduction factor | Fibre concentration | fibre dispersion degree | fibre dispersion |
|---|---|---|---|---|---|---|
| G31 | 0.13035906 | 0.767269335 | 0.767269335 | 0.001% | 28890.23953 | 0.288902395 |
| G32 | 0.12895596 | 0.806983479 | 0.806983479 | 0.001% | 24381.31863 | 0.243813186 |
| G33 | 0.13814064 | 0.764052212 | 0.764052212 | 0.001% | 33101.5434 | 0.331015434 |

Figure 10:
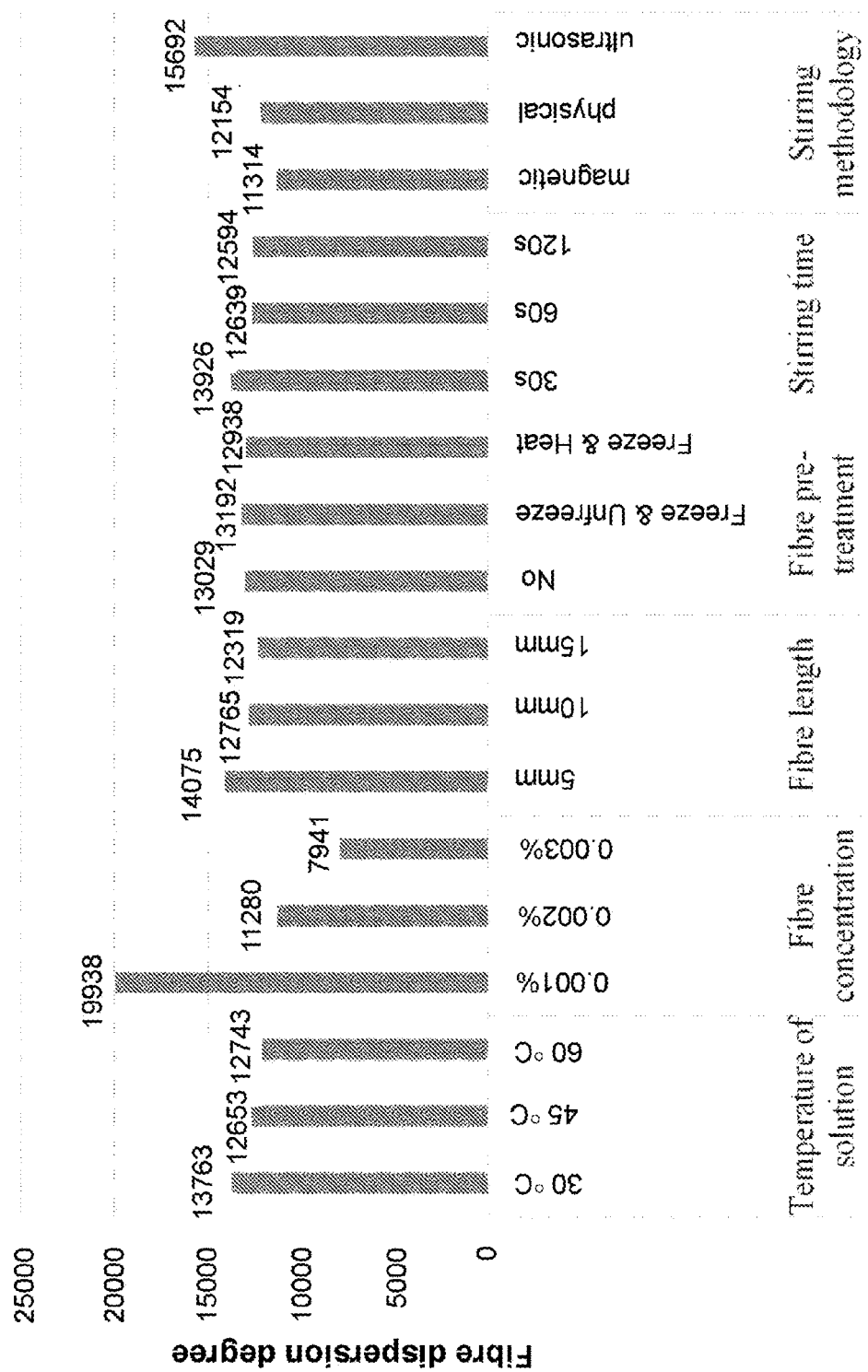
FIG. 10 shows statistical analysis of the experimental results using Minitab software and the effect of experimental variables for providing homogeneously dispersed discontinuous fibres in a dispersion medium.

Statistical analysis of the experimental results using Minitab software is shown in FIG. 10. Tabulated results of the statistical analysis as shown in FIG. 10 is shown in Table 3.

For ease of data processing and fibre detection, photographic images (not shown) were taken using a camera and the images divided into two regions based on preliminary (first region) and advanced alignment (second region) of the

TABLE 3

| | Tabulated results | | | | | |
|---|---|---|---|---|---|---|
| Variables | Temperature of solution | Fibre concentration | Fibre length | Fibre pre-treatment | Stirring time | Stirring methodology |
| 1 | 13763 | 19938 | 14075 | 13029 | 13926 | 11314 |
| 2 | 12653 | 11280 | 12765 | 13192 | 12639 | 12154 |
| 3 | 12743 | 7941 | 12319 | 12938 | 12594 | 15692 |
| Delta | 1110 | 11997 | 1755 | 253 | 1332 | 4378 |
| Rank | 5 | 1 | 3 | 6 | 4 | 2 |

*Rank from most (1) to east important (6)

Summary of Results

The effect of each variable (from most important to least important) for providing dispersion homogeneity is provided below:
(1) fibre concentration;
(2) stirring method;
(3) fibre length;
(4) stirring time;
(5) temperature of solution; and
(6) pre-treatment.

shearing element as described in Example 1. ImageJ software was used to detect fibres and analyse alignment degree in both regions.

Degree of alignment within the first and second regions of the shearing element

The degree of fibre alignment of discontinuous fibres within the first region and second region of the shearing element is shown in Table 4, respectively.

TABLE 4

Fibre alignment in the first and second region of the shearing element

| Degree of aligned fibres | Percentage of discontinuous fibres |
|---|---|
| First region | |
| Fibre < ±5° | 15 |
| ±5° < Fibre < ±10° | 13 |
| ±10° < Fibre < ±15° | 10 |
| Fibre < ±15° | 38 |
| ±15° < Fibre < ±20° | 9 |
| ±20° < Fibre < ±30° | 11 |
| ±30° < Fibre < ±50° | 17 |
| ±50° < Fibre | 25 |
| Second region | |
| Fibre < ±5° | 22 |
| ±5° < Fibre < ±10° | 56 |
| ±10° < Fibre < ±15° | 0 |
| Fibre < ±15° | 78 |
| ±15° < Fibre < ±20° | 11 |
| ±20° < Fibre < ±30° | 0 |
| ±30° < Fibre < ±50° | 11 |
| ±50° < Fibre | 0 |

Degree of alignment of discontinuous fibres after deposition on a substrate.

In this section, orientation of discontinuous fibres was measured after deposition of fibres on a collection mat. To further investigate different collection scenarios, different collection/deposition speeds were tested (low—about 0.1 m/s, medium—about 0.15 m/s and high—about 0.3 m/s. The results are presented in Table 5 below.

TABLE 5

Distribution of fibre alignment after collection on a substrate at low, medium and high deposition/collection speed

| Degree of aligned fibres | Percentage of discontinuous fibres |
|---|---|
| Low (about 0.1 m/s) | |
| Fibre < ±5° | 58 |
| ±5° < Fibre < ±10° | 7 |
| ±10° < Fibre < ±15° | 4 |
| Fibre < ±15° | 69 |
| ±15° < Fibre < ±20° | 5 |
| ±20° < Fibre < ±30° | 7 |
| ±30° < Fibre < ±50° | 7 |
| ±50° < Fibre | 12 |
| Medium (about 0.15 m/s) | |
| Fibre < ±5° | 54 |
| ±5° < Fibre < ±10° | 3 |
| ±10° < Fibre < ±15° | 2 |
| Fibre < ±15° | 59 |
| ±15° < Fibre < ±20° | 3 |
| ±20° < Fibre < ±30° | 7 |
| ±30° < Fibre < ±50° | 9 |
| ±50° < Fibre | 22 |
| High (about 0.3 m/s) | |
| Fibre < ±5° | 57 |
| ±5° < Fibre < ±10° | 5 |
| ±10° < Fibre < ±15° | 2 |
| Fibre < ±15° | 64 |
| ±15° < Fibre < ±20° | 5 |
| ±20° < Fibre < ±30° | 8 |
| ±30° < Fibre < ±50° | 11 |
| ±50° < Fibre | 12 |

These experiments showed that 81% of fibre alignment could be achieved within 30 degree while 69% of fibres could be aligned within 15 degrees. The precision of alignment can be improved by further adjustment and modifications.

Example 4—CFD Model Simulation

Injected Fluid Velocity

Injected fluid velocity was evaluated using computational fluid dynamics (CFD) analyses for the embodiment as shown in FIG. 4 and FIG. 5 and as described in Example 1.

The fluid velocity for this embodiment is generated by gravitational forces.

The value is calculated based on $v=\sqrt{2gh}$, where the h is the vertical displacement and g is the gravitational acceleration constant.

For initial analysis, it was assumed to use height change of a water tank as shown in FIG. 4 to increase flow velocity. However, modifications to the present invention can be made to the present invention such as using a pump to modify and control flow velocity.

Changing water tank height provides the following injected fluid velocity:

0.01 m, 0.4 m/s;
0.05 m, 1 m/s;
0.1 m, 1.4 m/s;
0.2 m, 2 m/s; and
0.5 m, 3.1 m/s.

The optimum configuration for the embodiment was a tank height at 0.01 m providing an inlet fluid velocity 0.4 m/s. This provided minimal turbulent fluid flow and/or greatest fibre alignment.

CFD analysis of the first region of the shearing element (yz plane/z direction alignment)

The geometry of flow stabiliser section and realignment channel were designed and evaluated using computational fluid dynamics (CFD) analyses. Based on CFD outcomes, optimum design was selected (FIG. 5-7) and manufactured using a 3D printer. Two plastic panels (housing) were installed on top and front face of the shearing element as in FIG. 5b to record the fluid behaviour during the alignment process using DSLR camera. However, the shearing element of the present invention can be used without a housing such as in FIG. 5b.

Comparison Between the Linear Change or Curvilinear Change

CFD analysis was performed by adjusting the ramp surface of the first region of the shearing element including substantially planar, convex or concave surface (i.e., z axis).

It was found that fluid flow behaviour for the same shape/configuration in xy (horizontal plane when laid flat parallel to a ground surface) and yz plane (cross section of the ramp surface such as in FIG. 5b and FIG. 6a) are different due to the effect of gravity on z direction (direction perpendicular to a ground surface). The preferred shape to avoid turbulence is concave (i.e., curve up in the z direction).

Optimising curvilinear shape by changing radius of curvature of ramp surface

CFD analysis was performed by adjusting the radius of curvature (α) of the ramp surface of the first region of the shearing element at 5 degrees, 15 degrees, 25 degrees, 45 degrees and 55 degrees.

When the angle is over 15 degrees, turbulence is almost negligible. From 15 to 45 degrees, fluid behaviour is similar, but the stream lines of fluid flow for 15 degrees is more evenly distributed.

Therefore, a radius of curvature of 15 degrees of the ramp surface is preferred although other angles can be used.

Comparison of the height (yz plane cross section) of the inlet (W1in) and outlet (W1out) of the first region of the shearing element.

Only the inlet dimension of the first region of the shearing element was changed. The outlet dimension was set at 10 mm (W1out). The following W1in/W1out ratios were tested:

16:1;
8:1; and
4:1.

Results showed that the effect of inlet and outlet ratio is not significant. One with 80 mm width inlet and 10 mm width outlet is preferred.

Comparison of the lengths of the first region of the shearing element (y axis).

Different lengths were tested to monitor fluid flow as follows:

100 mm;

200 mm; and 400 mm.

The preferred length is 200 mm.

Optimum design of the first region of the shearing element is shown in FIG. 6*a*.

CFD analysis of the second region of the shearing element (xy plane)

Comparison between the linear change or curvilinear change

CFD analysis was performed by adjusting the convergent surfaces of the second region of the shearing element including substantially planar, convex or concave surface (i.e., xy plane).

It was found that preferred shape fluid flow behaviour is curved in towards the dispersion medium (i.e., convex) as shown in FIG. 5.

Optimising curvilinear shape by changing radius of curvature of convergent surfaces CFD analysis was performed by adjusting the radius of curvature (a) of the convergent surfaces of the second region of the shearing element at 5 degrees, 15 degrees, 25 degrees, 45 degrees and 55 degrees.

The preferred radius of curvature was found to be 15 degrees.

Comparison of the different inlet (W2in) and outlet (W2out) dimensions of the second region of the shearing element The inlet (W2in) dimension was tested at the following dimensions:

300 mm;

150 mm;

100 mm; and 50 mm.

It was found that W2in at 150 mm and 50 mm dimensions both have less turbulence of fluid flow. However, the 50 mm inlet dimension was considered to be small, which can potentially reduce productivity/throughput for fibre alignment compared to that of 150 mm. 150 mm inlet dimension was preferred.

The outlet (W2out) dimension was tested at the following dimensions:

10 mm;

7.5 mm;

5 mm; and 2.5 mm.

It was found that by decreasing the dimension of outlet (W2out), turbulence of the fluid flow is more significant. 10 mm was the preferred size. The inventor notes that preferably the dimension of the outlet of the second region of the shearing element should not be greater than 10 mm for aligning 15 mm fibre lengths.

Comparison of the lengths of the second region of the shearing element (y axis).

Different lengths were tested to monitor fluid flow as follows:

100 mm;

200 mm;

300 mm; and 500 mm.

The preferred length is 200 mm.

Optimum design of the second region of the shearing element is shown in FIG. 6*b*; preferably tank height is set at 0.01 m higher than alignment shearing element for reaching 0.4 m/s velocity.

Example 5—Measurement of Dispersion Degree

The dispersion degree using the formula in Example 2 can be measured as follows. A region of interest of image is estimated to be a circular shape with diameter about 2500 pixels. The region of interest is meshed with 18*18 pixel squares (because the width of an individual fibre within the representative image is only about 1-2 pixels in this example). However, a side length of a square can also be within 9 to 40 pixels, which is neither too larger nor too small. fibre; is the percentage of fibre pixels within all the squares which belongs to i-th column relative to all the fibre pixels within the entire circular view ($fibre_i$=sum of the fibre pixels in the squares within i-th column/total number of fibre pixels within the whole circular view), ideal; is the ideal percentage of fibre pixels within all the squares which belong to i-th column relative to all the fibre pixels within the entire circular view. The "ideal" indicates the situation where the fibres are perfectly uniformly distributed within the circular view. Thus, ideal; can be calculated as the percentage of area within all the squares which belong to i-th column relative to the total area of the meshed circular view. ideal; =(area of an i-th column of a circular view)/(total area of the circular view). This is also the reason why the ideal position is a perfect semi-circular shape along both columns and rows. In the present example, the side length of each square is 18 pixels. Thus, there are approximately 140 rows and columns respectively (2500/18=140). fibre, and ideal, are vectors with 140 elements. Then, one can compare the similarity of these two vectors. To achieve this aim, correlation coefficient is used.

To calculate the correlation coefficient (which reflects the similarity between the real distribution against an ideal distribution), the following Pearson correlation coefficient equation can be used below.

$$\rho(A, B) = \frac{1}{N-1}\sum_{i=1}^{N}\left(\frac{A_i - \mu_A}{\sigma_A}\right)\left(\frac{B_i - \mu_B}{\sigma_B}\right),$$

wherein N is number of scalar observations, $\mu_A$ and $\sigma_A$ are the mean and standard deviation of A, respectively, and $\mu_B$ and GB are the mean and standard deviation of B.

In the present example, $Fibre_{mean}$ is the mean of all fibre; which is analogous to $\mu_A$, $fibre_i$ and $ideal_i$ are analogous to A and B, respectively, $ideal_{mean}$ is the mean of all ideal, which is analogous to $\mu_B$, $Coef_{row}$ is the correlation coefficient from the perspective of square rows by comparing the real distribution and the ideal distribution which is analogous to ρ(A,B), $Coef_{col}$ is the correlation coefficient from the perspective of square columns by comparing the real distribution and the ideal distribution which is analogous to $\rho(A,B)$, ratio$_{ij}$: the proportion of fibre pixel in the square of i-th row and j-th column, ratio$_{ij}$ constitutes a matrix with size about 140*140 and all$_{SD}$: the standard deviation of ratio$_{ij}$, which reflects the significance of differences from the ideal distribution.

The fibre pixels are then weighted based on the greyscale pixel intensity (weighted fraction). The darker regions represent the fibre bundles. In reality, a fibre bundle contains multiple fibres. Thus, the weight is added for darker pixels.

Fibre bundle percentage=(Total weighted fibre bundle pixel)/(Total weighted fibres), based on the weighted fibre amount, this percentage reflect how many fibres are detected in the form of fibre bundles. Higher percentage means more fibres have not been well dispersed as they remain in the form of bundles instead of separate fibres.

To reduce noise, a square with clear fibre structure is defined where the percentage of fibre pixels within that square is greater than 5%. fibre$_{sd}$ is the standard deviation of the percentages of fibre pixels within all the squares with clear fibre structure. The main purpose of this parameter is to measure the effect after denoise (reducing noise).

Example 6—a Composite Material

Typically, the aligned discontinuous fibres provided by Example 1 can be impregnated with a binder to form a composite (such as a fibre mat). The composite material comprising substantially aligned fibres and binder can be stored in its uncured stage as a "pre-preg" or may be cured as desired. The composite material can also be moulded in a hydraulic press or by passing the material through pinch rollers. The temperature when moulding or extruding to consolidate the composite material should be at a temperature where the material is malleable to provide processability while not being too high such that the binder is free flowing causing loss of alignment or resin.

Curing and consolidation can be performed using any conventional technique such as hot pressing.

Those skilled in the art will appreciate that the invention described herein is susceptible to variations and modifications other than those specifically described. It is understood that the invention includes all such variations and modifications which fall within the spirit and scope of the present invention.

The claims defining the invention are as follows:

1. A method for aligning discontinuous fibres comprising:
   providing a stream of discontinuous fibres in a dispersion medium;
   applying a shear stress to the dispersion medium using a shearing element to align at least a portion of the discontinuous fibres, wherein the shearing element has an inlet for receiving the stream of discontinuous fibres in a dispersion medium and an outlet,
   wherein the shearing element comprises a first region having at least one ramp surface on a first plane having an angle between about 5 to about 90 degrees relative to the direction of the stream of discontinuous fibres for aligning at least a portion of the discontinued fibres and a second region having at least two convergent surfaces on a second plane for aligning at least a portion of the discontinued fibres,
   wherein the angle between the first plane and the second plane is between about 5 to about 90 degrees; and
   disposing the at least a portion of the aligned discontinuous fibres on a substrate thereby providing a layer of substantially aligned discontinuous fibres.

2. The method of claim 1, further comprising passing the stream of discontinuous fibres through a force field to align at least a portion of the discontinuous fibres.

3. The method of claim 1, wherein the first region and second region independently applies shear stress to align at least a portion of the discontinuous fibres.

4. The method of claim 1, wherein the first region and second region sequentially applies shear stress to the dispersion medium to align at least a portion of the discontinuous fibres.

5. The method of claim 1, wherein the shear stress applied to the dispersion medium of the first region is less than the shear stress applied to the dispersion medium of the second region.

6. The method of claim 1, further comprising providing homogeneously dispersed discontinuous fibres in a dispersion medium prior to providing the stream of discontinuous fibres.

7. The method of claim 1, wherein the dispersion medium comprises discontinuous fibres in an amount of from about 0.001% to about 35% w/w.

8. The method of claim 2, wherein the force field is selected from the group consisting of a magnetic field, an electric field, an electromagnetic field and combinations thereof.

9. A carbon fibre reinforced polymer (CFRP) composite comprising discontinuous fibres aligned by the method of claim 1.

10. A fibre aligning apparatus comprising:
    a shearing element for applying a shear stress to a dispersion medium having an inlet adapted for receiving a stream of discontinuous fibres in a dispersion medium and an outlet,
    wherein the shearing element comprises a first region having at least one ramp surface on a first plane having an angle between about 5 to about 90 degrees relative to the direction of the stream of discontinuous fibres for aligning at least a portion of the discontinued fibres and a second region having at least two convergent surfaces on a second plane for aligning at least a portion of the discontinued fibres,
    wherein the angle between the first plane and the second plane is between about 5 to about 90 degrees;
    such that in use, the stream of discontinuous fibres undergoes shear stress thereby providing substantially aligned discontinuous fibres.

11. The fibre aligning apparatus according to claim 10, further comprising a force field element associated with the shearing element for aligning at least a portion of the discontinuous fibres such that in use, the stream of discontinuous fibres undergoes shear stress and interact with a force field of the force field element thereby providing substantially aligned discontinuous fibres.

12. The fibre aligning apparatus according to claim 11, wherein the force field element is a magnetic field generator, electric field generator or an electromagnetic field generator.

13. The fibre aligning apparatus according to claim 10, wherein the at least one ramp surface is substantially planar, convex or concave.

14. The fibre aligning apparatus according to claim 10, wherein the ramp surface has a radius of curvature of between about 2 to 60 degrees.

15. The fibre aligning apparatus according to claim 10, wherein the at least two convergent surfaces are independently substantially planar, convex or concave.

16. The fibre aligning apparatus according to claim 10, wherein each convergent surface independently has a radius of curvature of between about 2 to 60 degrees.

17. The fibre aligning apparatus according to claim 11, wherein the shearing element and force field element are positioned sequentially.

18. The fibre aligning apparatus according to claim 11, wherein the shearing element and force field element are co-located.

19. The fibre aligning apparatus according to claim 11, wherein the shearing element and force field element are integrally connected.

20. The fibre aligning apparatus according to claim 11, wherein the force field element is selected from the group consisting of a magnet, charged plates, electromagnet and combinations thereof.

* * * * *